United States Patent
Giusti et al.

(10) Patent No.: US 10,761,611 B2
(45) Date of Patent: Sep. 1, 2020

(54) RADAR-IMAGE SHAPER FOR RADAR-BASED APPLICATIONS

(71) Applicant: Google LLC, Mountain View, CA (US)

(72) Inventors: Leonardo Giusti, San Francisco, CA (US); Ivan Poupyrev, Sunnyvale, CA (US); Eiji Hayashi, Cupertino, CA (US); Patrick M. Amihood, Palo Alto, CA (US); Bryan Allen, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/189,346

(22) Filed: Nov. 13, 2018

(65) Prior Publication Data
US 2020/0150771 A1 May 14, 2020

(51) Int. Cl.
*G06F 3/00* (2006.01)
*G06F 3/01* (2006.01)
(Continued)

(52) U.S. Cl.
CPC .............. *G06F 3/017* (2013.01); *G01S 13/06* (2013.01); *G01S 13/89* (2013.01); *G06F 3/0304* (2013.01); *G06F 3/03545* (2013.01)

(58) Field of Classification Search
CPC .... G06F 3/017; G06F 3/0304; G06F 3/03545; G01S 13/06; G01S 13/89
See application file for complete search history.

(56) References Cited

U.S. PATENT DOCUMENTS

| 7,924,212 B2 | 4/2011 | Benitez et al. |
| 8,260,368 B2 | 9/2012 | Yin |

(Continued)

FOREIGN PATENT DOCUMENTS

| EP | 1309211 | 5/2003 |
| EP | 2637079 | 9/2013 |

(Continued)

OTHER PUBLICATIONS

"EP Appeal Decision", European Application No. 10194359.5, dated May 28, 2019, 20 pages.
(Continued)

*Primary Examiner* — Mahelet Shiberou
(74) *Attorney, Agent, or Firm* — Colby Nipper PLLC

(57) ABSTRACT

This document describes techniques and systems that enable a radar-image shaper for radar-based applications. A radar field enables an electronic device to accurately determine a characteristic disposition (e.g., a location, orientation, velocity, or direction) of an object in the radar field. The characteristic disposition is determined by detecting a radar cross-section (or radar signature) of a radar-image shaper that is included in the object. The shape of the radar-image shaper produces a known signature when illuminated by the radar field. Using these techniques, the electronic device can determine a characteristic disposition of the object, which allows the object to be used to interact with the electronic device using gestures and other position-based techniques. Because the radar-image shaper enables a passive object to control applications on the electronic device, users have an interaction method with a rich library of gestures and controls that does not require additional components or a battery.

20 Claims, 14 Drawing Sheets

(51) Int. Cl.
*G06F 3/0354* (2013.01)
*G01S 13/06* (2006.01)
*G01S 13/89* (2006.01)
*G06F 3/03* (2006.01)

(56) References Cited

U.S. PATENT DOCUMENTS

| | | |
|---|---|---|
| 8,723,986 B1 | 5/2014 | Merrill |
| 8,803,697 B2 | 8/2014 | Rautiainen |
| 8,837,696 B2 | 9/2014 | Meriaz et al. |
| 9,569,003 B2 | 2/2017 | Rofougaran et al. |
| 9,589,565 B2 | 3/2017 | Boies et al. |
| 9,600,177 B2 | 3/2017 | Iyer et al. |
| 9,632,584 B2 | 4/2017 | Dodge |
| 9,747,072 B2 | 8/2017 | Noble et al. |
| 9,811,164 B2 | 11/2017 | Poupyrev |
| 9,921,657 B2 | 3/2018 | Sprenger et al. |
| 10,217,488 B1 | 2/2019 | Huang |
| 10,698,603 B2 | 6/2020 | Giusti et al. |
| 2005/0128124 A1 | 6/2005 | Greneker et al. |
| 2005/0242984 A1 | 11/2005 | Waters |
| 2007/0015559 A1* | 1/2007 | Zalewski ............... G06F 3/017 463/1 |
| 2007/0117625 A1* | 5/2007 | Marks ................... G06F 3/0346 463/30 |
| 2007/0202858 A1 | 8/2007 | Yu |
| 2008/0029316 A1* | 2/2008 | Jaeger ................... G06F 3/042 178/19.01 |
| 2008/0055105 A1 | 3/2008 | Blum et al. |
| 2009/0228841 A1 | 9/2009 | Hildreth |
| 2009/0322690 A1 | 12/2009 | Hiltunen et al. |
| 2011/0181510 A1 | 7/2011 | Hakala et al. |
| 2011/0221667 A1 | 9/2011 | Lee |
| 2011/0237274 A1 | 9/2011 | Wong et al. |
| 2011/0313768 A1 | 12/2011 | Klein et al. |
| 2012/0280900 A1 | 11/2012 | Wang et al. |
| 2013/0023248 A1 | 1/2013 | Lee |
| 2013/0053007 A1 | 2/2013 | Cosman et al. |
| 2013/0057571 A1 | 3/2013 | Harris |
| 2013/0120458 A1 | 5/2013 | Celebisoy et al. |
| 2013/0241823 A1* | 9/2013 | Pryor .................... G06F 3/011 345/156 |
| 2013/0300671 A1 | 11/2013 | Hallerström Sjöstedt et al. |
| 2014/0267130 A1 | 9/2014 | Hwang et al. |
| 2014/0315531 A1 | 10/2014 | Joong et al. |
| 2014/0379341 A1 | 12/2014 | Seo et al. |
| 2014/0380249 A1 | 12/2014 | Fleizach |
| 2015/0036999 A1 | 2/2015 | Batur et al. |
| 2015/0187137 A1 | 7/2015 | Mullins |
| 2015/0277569 A1* | 10/2015 | Sprenger .............. G06F 3/017 345/156 |
| 2015/0346820 A1 | 12/2015 | Poupyrev et al. |
| 2015/0365540 A1 | 12/2015 | Davis et al. |
| 2016/0026327 A1 | 1/2016 | Park et al. |
| 2016/0041617 A1 | 2/2016 | Poupyrev |
| 2016/0041618 A1 | 2/2016 | Poupyrev |
| 2016/0054803 A1 | 2/2016 | Poupyrev |
| 2016/0062590 A1 | 3/2016 | Karunamuni et al. |
| 2016/0098089 A1 | 4/2016 | Poupyrev |
| 2016/0140763 A1 | 5/2016 | Seichter et al. |
| 2016/0162145 A1 | 6/2016 | Rivers et al. |
| 2016/0234369 A1 | 8/2016 | Jung et al. |
| 2016/0241720 A1 | 8/2016 | Cheatham et al. |
| 2016/0252607 A1 | 9/2016 | Saboo et al. |
| 2016/0259037 A1 | 9/2016 | Molchanov et al. |
| 2016/0358588 A1 | 12/2016 | O'Neill |
| 2017/0097413 A1 | 4/2017 | Gillian et al. |
| 2017/0235458 A1 | 8/2017 | Tsurumi |
| 2017/0289766 A1 | 10/2017 | Scott et al. |
| 2017/0289954 A1 | 10/2017 | Mese et al. |
| 2017/0308131 A1 | 10/2017 | Geva |
| 2017/0349184 A1 | 12/2017 | Tzirkel-Hancock et al. |
| 2018/0018965 A1 | 1/2018 | Daley |
| 2018/0032997 A1 | 2/2018 | Gordon et al. |
| 2018/0098351 A1 | 4/2018 | Amel et al. |
| 2018/0224980 A1 | 8/2018 | Avila et al. |
| 2018/0374143 A1 | 12/2018 | Williamson et al. |
| 2020/0057504 A1 | 2/2020 | Lien et al. |
| 2020/0064445 A1 | 2/2020 | Amihood et al. |
| 2020/0064458 A1 | 2/2020 | Giusti et al. |
| 2020/0064996 A1 | 2/2020 | Giusti et al. |
| 2020/0066236 A1 | 2/2020 | Giusti et al. |
| 2020/0125158 A1 | 4/2020 | Giusti et al. |
| 2020/0193942 A1 | 6/2020 | Giusti et al. |

FOREIGN PATENT DOCUMENTS

| | | |
|---|---|---|
| EP | 2887092 | 6/2015 |
| GB | 2554957 | 4/2018 |
| WO | 2018118895 | 6/2018 |
| WO | 2018208958 | 11/2018 |
| WO | 2020040966 | 2/2020 |
| WO | 2020040968 | 2/2020 |
| WO | 2020040970 | 2/2020 |
| WO | 2020086215 | 4/2020 |

OTHER PUBLICATIONS

"Galaxy S4 Air Gesture", Galaxy S4 Guides, https://allaboutgalaxys4.com/galaxy-s4-features-explained/air-gesture/, 4 pages.
"Non-Final Office Action", U.S. Appl. No. 16/112,130, dated Sep. 20, 2019, 14 Pages.
"Samsung Galaxy S4 Air Gestures", Video from https://www.youtube.com/watch?v=375Hb87yGcg, May 7, 2013.
"Position Sensors", https://developer.android.com/guide/topics/sensors/sensors_position.html, downloaded Mar. 22, 2018, 5 pages.
Cravotta, "Optimizing Proximity Sensing for Consumer Electronics Applications", Apr. 26, 2012, 7 pages.
"International Search Report and Written Opinion", PCT Application No. PCT/US2019/045144, dated Jan. 2, 2020, 18 pages.
"International Search Report and Written Opinion", PCT Application No. PCT/US2019/053568, dated Dec. 20, 2019, 14 pages.
"International Search Report and Written Opinion", PCT Application No. PCT/US2019/053602, dated Dec. 6, 2019, 23 pages.
"Invitation to Pay Additional Fees", PCT Application No. PCT/US2019/045144, dated Oct. 28, 2019, 10 pages.
"Invitation to Pay Additional Fees", PCT Application No. PCT/US2019/045142, dated Oct. 29, 2019, 10 pages.
"Invitation to Pay Additional Fees", PCT Application No. PCT/US2019/045128, dated Nov. 11, 2019, 16 pages.
"Micropower Impulse Radar (MIR)", Ohio State et. al., retrieved from the internet: http:..web.cse.ohio-state.edu/siefast/nest/nest_webpage/posters/OSU-poster-alineinthestand-MIR.pdf, Sep. 1, 2003, 1 page.
"Restriction Requirement", U.S. Appl. No. 16/109,534, dated Jan. 7, 2020, 6 Pages.
Lien, et al., "Soli: Ubiquitous Gesture Sensing with Millimeter Wave Radar", ACM Trans. Graph., vol. 35, No. 4, Article 142, Jul. 1, 2016, 19 pages.
Paulson, et al., "Ultra-Wideband Radar Methods and Techniques of Medical Sensing and Imaging", SPIE, USA, Sep. 2, 2003, XP040212116, 12 pages.
"International Search Report and Written Opinion", PCT Application No. PCT/US2019/045128, dated Jan. 14, 2020, 22 pages.
"First Action Interview Office Action", U.S. Appl. No. 16/109,534, dated Mar. 17, 2020, 3 Pages.
"International Search Report and Written Opinion", PCT Application No. PCT/US2019/045142, dated Feb. 10, 2020, 19 pages.
"Notice of Allowance", U.S. Appl. No. 16/109,534, 5 Pages.
"Notice of Allowance", U.S. Appl. No. 16/112,130, dated Feb. 19, 2020, 8 Pages.
"Pre-Interview Communication", U.S. Appl. No. 16/109,534, dated Feb. 19, 2020, 3 Pages.
"Pre-Interview Communication", U.S. Appl. No. 16/166,900, dated Mar. 19, 2020, 4 Pages.
"Foreign Office Action", Korean Application No. 1020207008514, dated May 15, 2020, 6 pages.

(56) References Cited

OTHER PUBLICATIONS

"Notice of Allowance", U.S. Appl. No. 16/166,900, dated May 15, 2020, 7 pages.
"Pre-Interview Communication", U.S. Appl. No. 16/108,815, dated Jun. 8, 2020, 3 pages.

* cited by examiner

RADAR-IMAGE SHAPER FOR RADAR-BASED APPLICATIONS

BACKGROUND

Many applications can be interacted with using a trackable controller that allows the application to sense the position and motion of the controller. Gaming controllers, remote controls for television and other media devices, styluses, and other controllers allow users to play games, select and change programming, manipulate and create content, and perform countless other functions using gestures made with the controller. As the number and kind of applications that can be controlled this way increases, so does the number and complexity of the motions used with the controllers, which can be frustrating for users. Conventional controllers use targets that can be tracked by cameras in the device being controlled or an inertial measurement unit (IMU) that can provide position information to the device being controlled. These controllers, which often include their own electronics, such as processors and selectable controls, can help provide some of this additional functionality, but also require their own power source. For example, changing the mode of a gaming controller from a steering mechanism to a weapon and back or changing a stylus from a content-creation mode (e.g., drawing a line or changing the color of the line) to an editing mode (e.g., for manipulating content by moving a line or object) can require a cumbersome process of entering commands on the controller or another device. Consequently, taking advantage of the flexibility and realism provided by trackable controllers can be inconvenient and frustrating, and we may not realize the full potential of our electronic devices and applications.

SUMMARY

This document describes techniques and systems that enable a radar-image shaper for radar-based applications. The techniques and systems use a radar field to enable an electronic device to accurately determine a characteristic disposition of an object in the radar field (a location, an orientation, a velocity, or a direction of the object at a particular time). The object's characteristic disposition is determined by detecting a radar cross-section (or radar signature) of a radar-image shaper that is included in the object. The radar-image shaper is a component made from a specified material and having a specific shape that produces a known signature when illuminated by the radar field. Using these techniques, the electronic device can determine a characteristic disposition of the object, which allows the object to be used to interact with the electronic device with gestures and other position-based techniques. Because the radar-image shaper enables an otherwise passive object to control applications on the electronic device, users have an interaction method with a rich library of gestures and controls that does not require additional components or a battery.

Aspects described below include an electronic device comprising a radar system, one or more computer processors, and one or more computer-readable media. The radar system is implemented at least partially in hardware and provides a radar field. The radar system also senses reflections from an object in the radar field and analyzes the reflections from the object in the radar field. The radar system further provides, based on the analysis of the reflections, radar data. The one or more computer-readable media include stored instructions that can be executed by the one or more computer processors to implement a radar-signature manager. The radar-signature manager detects, based on a first subset of the radar data, a radar signature of a radar-image shaper that is attached to the object in the radar field. The radar-signature manager also compares the detected radar signature to a benchmark radar signature that corresponds to a characteristic disposition of the radar-image shaper and determines, based on the comparison, that the detected radar signature matches the benchmark radar signature. In response to the determination that the detected radar signature matches the benchmark radar signature, the radar-signature manager determines, based on the characteristic disposition of the radar-image shaper that corresponds to the matched benchmark radar signature, a characteristic disposition of the object in the radar field.

Aspects described below also include a method, implemented by an electronic device that includes a radar system. The method comprises providing, by the radar system, a radar field and sensing, by the radar system, reflections from an object in the radar field. The method also includes analyzing the reflections from the object in the radar field and providing, based on the analysis of the reflections, radar data. The method additionally includes detecting, based on a first subset of the radar data, a radar signature of the radar-image shaper and comparing the detected radar signature to a benchmark radar signature that corresponds to a characteristic disposition of a radar-image shaper. The method also includes determining, based on the comparison, that the detected radar signature matches the benchmark radar signature. The method additionally includes, responsive to determining that the detected radar signature matches the benchmark radar signature, determining a characteristic disposition of the object in the radar field, based on the characteristic disposition of the radar-image shaper that corresponds to the matched benchmark radar signature.

Aspects described below include a stylus, comprising a stylus housing and a radar-image shaper integrated with the stylus housing. The radar-image shaper is configured to provide a radar signature that is detectable by a radar system, and the radar signature is effective to enable the radar system to determine a characteristic disposition of the housing.

Aspects described below also include a system comprising an electronic device that includes, or is associated with, a first means. The first means is a means for providing a radar field, sensing reflections from an object in the radar field, analyzing the reflections from the object in the radar field, and providing, based on the analysis of the reflections, radar data. The system also includes a second means. The second means is a means for detecting, based on a first subset of the radar data, a radar signature of a radar-image shaper that is attached to the object in the radar field. The second means also compares the detected radar signature to a benchmark radar signature that corresponds to a characteristic disposition of the radar-image shaper and determines, based on the comparison, that the radar signature matches the benchmark radar signature. In response to the determination that the radar signature matches the benchmark radar signature, the second means determines a characteristic disposition of the object in the radar field, based on the characteristic disposition of the radar-image shaper that corresponds to the matched benchmark radar signature.

This summary is provided to introduce simplified concepts concerning a radar-image shaper for radar-based applications, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a radar-image shaper for radar-based applications are described in this document with reference to the following drawings. The same numbers are used throughout the drawings to reference like features and components.

DETAILED DESCRIPTION

Overview

Figure 1:
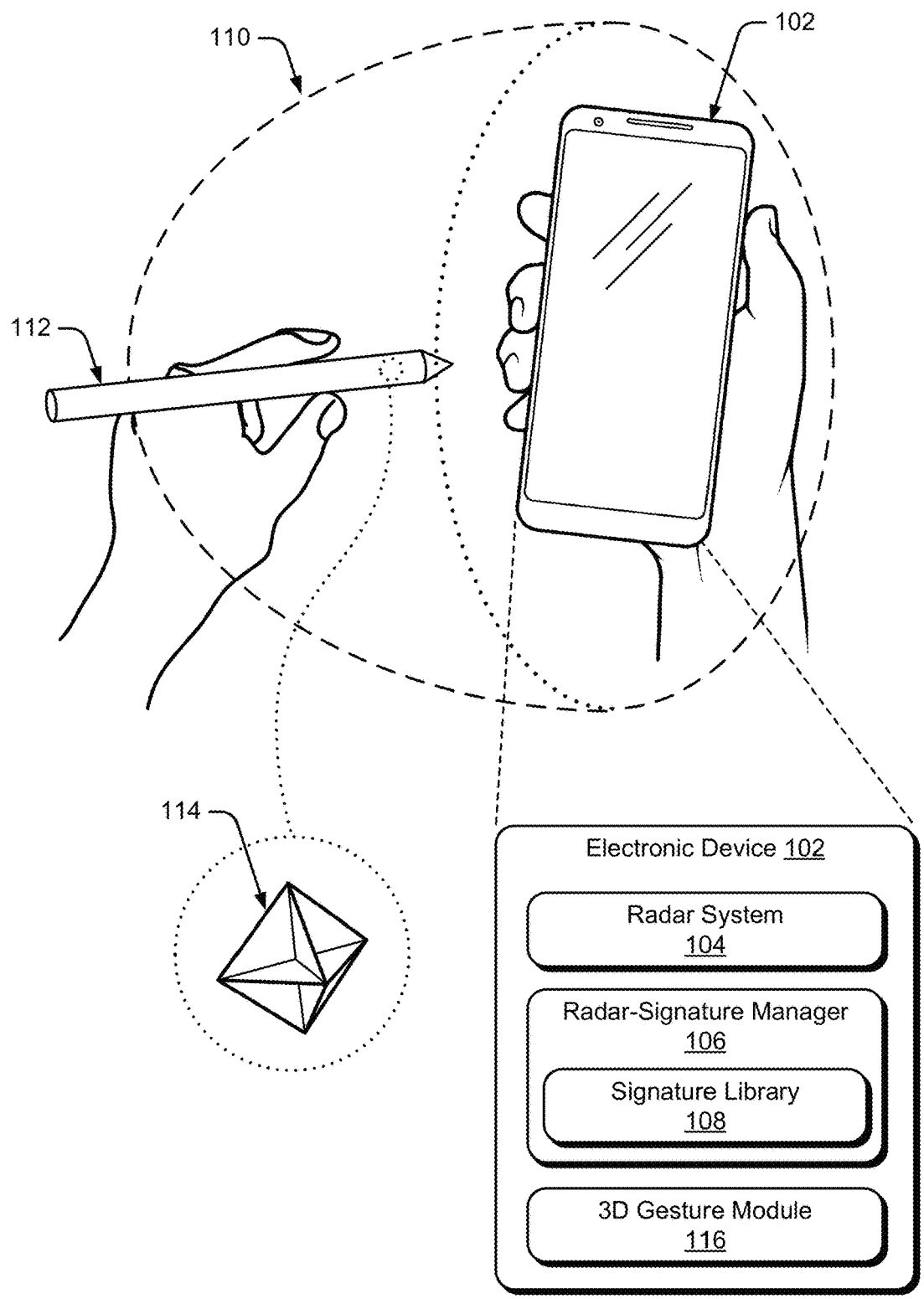
FIG. 1 illustrates an example environment in which techniques enabling a radar-image shaper for radar-based applications can be implemented.

This document describes techniques and systems that enable a radar-image shaper for radar-based applications. As noted, using a trackable controller can be convenient, but may be frustrating for complex tasks that require multiple gestures or that have multiple modes. Further, even when the motion-based controller is an active device with its own components and power, it can be inconvenient to change modes or interaction methods, which can be frustrating to users, especially when working in a creative or competitive environment such as content creation or gaming. Thus, users may not realize the full potential of their applications because of limitations of the input device. The described techniques and systems employ a radar-image shaper in the controller that provides a unique radar reflection that can be detected by a radar system to accurately determine a characteristic disposition of the controller. In this case, accuracy is an increased degree of refinement, an increased conformity to truth, or both the increased degree of refinement and the increased conformity to truth. These techniques enable an increased amount of gestures and gesture combinations to be generated with the controller. Additionally, the described techniques are effective without adding electronic components or a power source to the controller. Because the radar system can accurately determine the gestures and improve the performance of the system while reducing the component count and power consumption of the controller, interactions may be more convenient and less frustrating.

Consider a controller, such as a gaming controller, that includes one or more radar-image shapers. The controller can be used with a gaming console or other electronic device that includes a radar-signature manager and a radar system that can be used to provide a radar field near the electronic device. The radar field can detect a radar signature of the radar-image shaper and, based on the radar signature, determine the characteristic disposition of the controller. For example, a gaming controller for playing an airplane-flying game or simulator may include a radar-image shaper at each end of the controller. The radar system in the gaming console can detect radar reflections from the radar-image shapers (e.g., the radar "signature" of the radar-image shaper) and compare the detected signatures to known reference signatures of various radar-image shapers. The comparison allows that the radar system to determine the characteristic disposition of the radar-image shaper and thus, the characteristic disposition of the controller. Further, the radar system can use other radar data (e.g., azimuth and range data) to determine a three-dimensional (3D) position of the radar-image shapers as well as movement and acceleration. In this way, a controller that has no electronic components and requires no dedicated power source can be used make complex gestures that can control a game or other application.

Some conventional controllers may use cameras, accelerometers, or inertial sensors to determine the characteristic disposition of the controller. For example, the controller may include powered sensors and a communication interface that can track the movements of the controller and send the information to the gaming console. In other cases, the conventional controller may include spherical or other objects that can be tracked by a camera connected to the gaming console. These conventional techniques, however, are often less accurate in determining position, especially 3D position, and typically require both additional components and a power source, which add cost and inconvenience (e.g., replacing batteries), and may lead to reliability issues (e.g., broken, damaged, or worn-out components). Further, in this example, the conventional gaming console itself also requires additional components (e.g., cameras and communication interfaces) that may introduce similar challenges. Thus, the conventional techniques may use more power and potentially provide a lower-quality user experience.

In contrast, the described systems and techniques can improve user experience and usability in several areas while reducing power consumption and maintenance costs. For instance, in the example above, the controller may be a "passive" controller (with no internal electronics or powered components) that can be accurately detected by a gaming console with a radar system that uses significantly less power than a camera. The radar system can use the radar signature of the radar-image shapers in the controller to accurately determine the characteristic disposition or movement of the controller. In this document, the term "characteristic disposition," with reference to an object, may refer to any, or a combination, of a location, an orientation, a velocity, or a direction of the object at a particular time. For example, the location of the object may be an absolute position of the object with reference to the radar system, such as a distance from the radar system and a position in 3D space (e.g., a slant range, an azimuth, and an elevation). Additionally, the orientation may be a position of the object with reference to the radar system and relative to one or more features of the object (e.g., how the object is "pointed" at the radar system, such as having a particular feature or surface of the object facing the radar system). The velocity may include an absolute velocity of the object or a velocity relative to the radar system. The direction may refer to movement of the object toward or away from the radar system.

The characteristic disposition may also include changes in any or all of those values over a period of time. For example, a change in the characteristic disposition of the object may include a change in an absolute or relative velocity, a change in a distance between the object and the radar system (e.g., whether the object is closer to or farther from the radar system), a change in an orientation, such as the object being turned toward or away from the radar system or rotating about an axis, or a change in direction.

In this way, the described techniques and systems provide a higher-quality user experience with the controller and gaming system. The user can enjoy the advantages and conveniences that are provided by the controller, while the radar-signature manager and radar system provide additional flexibility and enhanced functionality, without excessive power consumption. Additionally, using a radar system to detect the characteristic disposition of the object can provide increased privacy and security because no video image of the user is necessary. Further, power consumption of the controller and the gaming console itself can be substantially less than some conventional techniques that may use an always-on camera (or other sensors or combinations of sensors) to control or detect the position and motion of the controller.

These are but a few examples of how the described techniques and devices may be used to enable a radar-image shaper for radar-based applications. Other examples and implementations of which are described throughout this document. The document now turns to an example environment, after which example systems, apparatuses, methods, and components are described.

Operating Environment

FIG. 1 illustrates an example environment 100 in which techniques enabling a radar-image shaper for radar-based applications can be implemented. The example environment 100 includes an electronic device 102, which includes, or is associated with, a radar system 104, a radar-signature manager 106 (signature manager 106), and a signature library 108.

In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar system 104 also enables the electronic device 102, or another electronic device, to sense and analyze reflections from an object 112 in the radar field 110. Some implementations of the radar system 104 are particularly advantageous as applied in the context of smartphones, such as the electronic device 102, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the embodiments are particularly advantageous in the described context of the smartphone for which fine radar-detected hand gestures are required, it is to be appreciated that the applicability of the features and advantages of the present invention is not necessarily so limited, and other embodiments involving other types of electronic devices may also be within the scope of the present teachings.

The object 112 may be any of a variety of objects. In some cases, the object 112 may be an object from which the radar system 104 can sense and analyze radar reflections, such as wood, plastic, metal, fabric, a human body, or a body part (e.g., a foot, hand, or finger of a user of the electronic device 102). As shown in FIG. 1, the object 112 is a stylus. The object 112 includes a radar-image shaper 114 that is attached to the object 112. The radar-image shaper may be integrated with the object 112, as shown in FIG. 1, or attached to the object 112 in a removable manner. Based on the analysis of the reflections, the radar system 104 can provide radar data that includes various types of information associated with the radar field 110 and the reflections from the object 112 and the radar-image shaper 114, as described with reference to FIGS. 3-6 (e.g., the radar system 104 can pass the radar data to other entities, such as the signature manager 106).

It should be noted that the radar data may be continuously or periodically provided over time, based on the sensed and analyzed reflections from the object 112 in the radar field 110. A position of the object 112 can change over time (e.g., the object 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth.

The radar-image shaper 114 is a component that has a recognizable radar signature (e.g., a larger radar cross-section). For example, the radar-image shaper 114 may include one or more corner reflectors (e.g., a shape made from two or three perpendicular intersecting flat surfaces that reflect the radar signal). The radar signature of the radar-image shaper 114 may vary depending on its characteristic disposition with respect to the radar system 104, which can allow the radar system 104 to determine the characteristic disposition of the object 112. Additional details of the radar-image shaper 114 are described with reference to FIG. 7 and FIG. 8.

The signature manager 106 enables the user to interact with or control various functions of the electronic device 102 (e.g., play games, operate applications or other programs, and control features of the electronic device 102). For example, the signature manager 106 can use one or more subsets of the radar data to detect the radar signature of the radar-image shaper 114. As noted, the radar-image shaper 114 may be integrated with the object in the radar field or attached in a removable manner. The signature manager 106 can compare the detected radar signature to a benchmark radar signature that corresponds to a characteristic disposition of the radar-image shaper.

For example, the signature manager 106 may compare the detected radar signature to the benchmark radar signature by using one or more subsets of the radar data to determine various features of the radar-image shaper 114 (e.g., characteristics of the radar data associated with particular materials, shapes, corners, edges, surfaces, or combinations thereof). The detected features can be analyzed to determine a match to corresponding known features of the benchmark radar signature. In some implementations, the radar-signature manager may compare the detected radar signature to a plurality of benchmark radar signatures that correspond to a different characteristic disposition of the radar-image shaper 114. For example, the signature manager 106 may compare the detected radar signature to a plurality of benchmark radar signatures stored in the signature library 108.

The signature library 108 is a memory device that can store benchmark radar signatures and other data, such as characteristic dispositions of the object 112 that correspond to characteristic dispositions of the radar-image shaper 114. The signature library 108 may be any suitable kind of memory that can be accessed and used by other components of the electronic device 102, such as the signature manager 106. The signature library 108 may be a part of the signature manager 106, as shown in FIG. 1. In other implementations, signature library 108 may be a part of the electronic device 102, but separate from the signature manager 106, or remote from the electronic device 102.

Based on the comparison between the detected radar signature and the benchmark radar signature, the signature manager 106 can determine that the detected radar signature matches the benchmark radar signature. In response to the determination that the radar signature matches the benchmark radar signature, the signature manager 106 can determine the characteristic disposition of the object in the radar field, based on the characteristic disposition of the radar-image shaper 114 that corresponds to the matched benchmark radar signature. Consider an example in which the signature manager 106 determines a particular characteristic disposition of the radar-image shaper 114 with reference to the electronic device 102. In this example, the signature manager 106 can also determine the characteristic disposition of the object 112 by accessing the signature library 108 (or another source) that stores data that includes characteristic dispositions of the object 112 that correspond to characteristic dispositions of the radar-image shaper 114.

In this way, the signature manager 106 can determine the characteristic disposition of the object 112, which enables the user to interact with or control the electronic device 102. For example, the signature manager 106 can determine the characteristic disposition of the object 112, as described above. As noted, determining the characteristic disposition of the object 112 may include determining one or more of a variety of different aspects of the characteristic disposition of the object 112, including combinations of any of the aspects. The aspects may include, for example, an absolute position of the object 112 with reference to the electronic device 102, a distance of the object 112 from the electronic device 102, a velocity of the object 112, a change in the position or distance of the object 112 with reference to the electronic device 102 (e.g., whether the object 112 is moving closer to or farther from the electronic device 102, is turned toward or away from the electronic device 102, is rotated about an axis, and so forth), or a change in the velocity of the object 112.

The signature manager 106 can also use one or more subsets of the radar data to determine a change in the characteristic disposition of the object 112 (e.g., by using the radar data to determine the characteristic disposition of the object 112 over time). Based on the change in the characteristic disposition of the object 112, the signature manager 106 can determine a gesture by the object 112. The signature manager 106 can then determine a function of the electronic device that corresponds to the gesture (e.g., using a three-dimensional (3D) gesture library, such as the 3D gesture module 116 described below) and cause the electronic device 102 to provide the function that corresponds to the gesture.

Consider an example in which the object 112 is a flight simulator gaming controller that includes one or more radar-image shapers 114. As a user holding the controller makes a gesture to turn the simulator up and to the left (e.g., a gesture that moves the controller toward the user and rotates the controller counter-clockwise). The signature manager 106 can determine the characteristic disposition of the gaming controller at the beginning of the gesture by determining the characteristic disposition of the radar-image shaper 114, as described above, and continue to determine the characteristic disposition of the controller through the duration of the gesture. This allows the signature manager 106 to use the determination of the gesture (or of multiple gestures) to enable the user to use the controller with the electronic device 102 to operate the flight simulator.

In some implementations, the electronic device 102 may also include, or be associated with, one or more other modules, interfaces, or systems. As shown in FIG. 1, the electronic device 102 includes the 3D gesture module 116, which can store both information related to determining 3D gestures based on the radar data and information related to actions that correspond to the 3D gestures. As shown in FIG. 1, the 3D gesture module 116 is depicted as part of the signature manager 106. In other implementations, however, the 3D gesture module 116 may be a separate entity that can be part of, or separate from, the electronic device 102.

A 3D gesture can be any of a variety of gestures made with the object 112, including movements toward or away from the electronic device 102, side-to-side movements, rotation of the object 112 about an axis, and so forth. In some cases, the object 112 may be an object worn on a user's body (e.g., on a finger or wrist) and the radar-signature manager can be used to detect 3D gestures made by the user, such as a scrolling gesture made by moving a hand above the electronic device 102 along a horizontal dimension (e.g., from a left side of the electronic device 102 to a right side of the electronic device 102), a waving gesture made by the user's arm rotating about an elbow, a pushing gesture made by moving the user's hand above the electronic device 102 along a vertical dimension (e.g., from a bottom side of the electronic device 102 to a top side of the electronic device 102). Other types of 3D gestures or motions may also be made, such as a reaching gesture made by moving the user's hand towards the electronic device 102, a knob-turning gesture made by curling fingers of the user's hand to grip an imaginary door knob and rotating in a clockwise or counter-clockwise fashion to mimic an action of turning the imaginary door knob, and a spindle-twisting gesture made by rubbing a thumb and at least one other finger together. Each of these example gesture types may be detected by the radar system 104.

Based on the radar data, or on one or more subsets of the radar data, the signature manager 106 can detect the 3D gesture by the object 112 and determine (e.g., using the 3D gesture module 116) that the gesture corresponds to a particular function or action of the electronic device 102. The particular function or action may be any of a variety of functions or actions, such as interacting with an application (e.g., browse for, select, or open the application), control a user interface for a game, media player, or another application, and so forth. In this way, the radar system 104 can provide touch-free control of the electronic device 102. Exemplary 3D gestures and corresponding actions are described with additional detail below.

As described with reference to FIGS. 3-6, the radar system 104 can use the radar field 110 to sense and analyze reflections from objects in the radar field 110 in ways that enable high resolution and accuracy for gesture recognition. Further, the 3D gestures may be predefined, selected from a list, or customized (e.g., the user may interact with the signature manager 106 and the radar system 104 to define unique gestures, or combination of gestures, as corresponding to particular actions).

Figure 2:
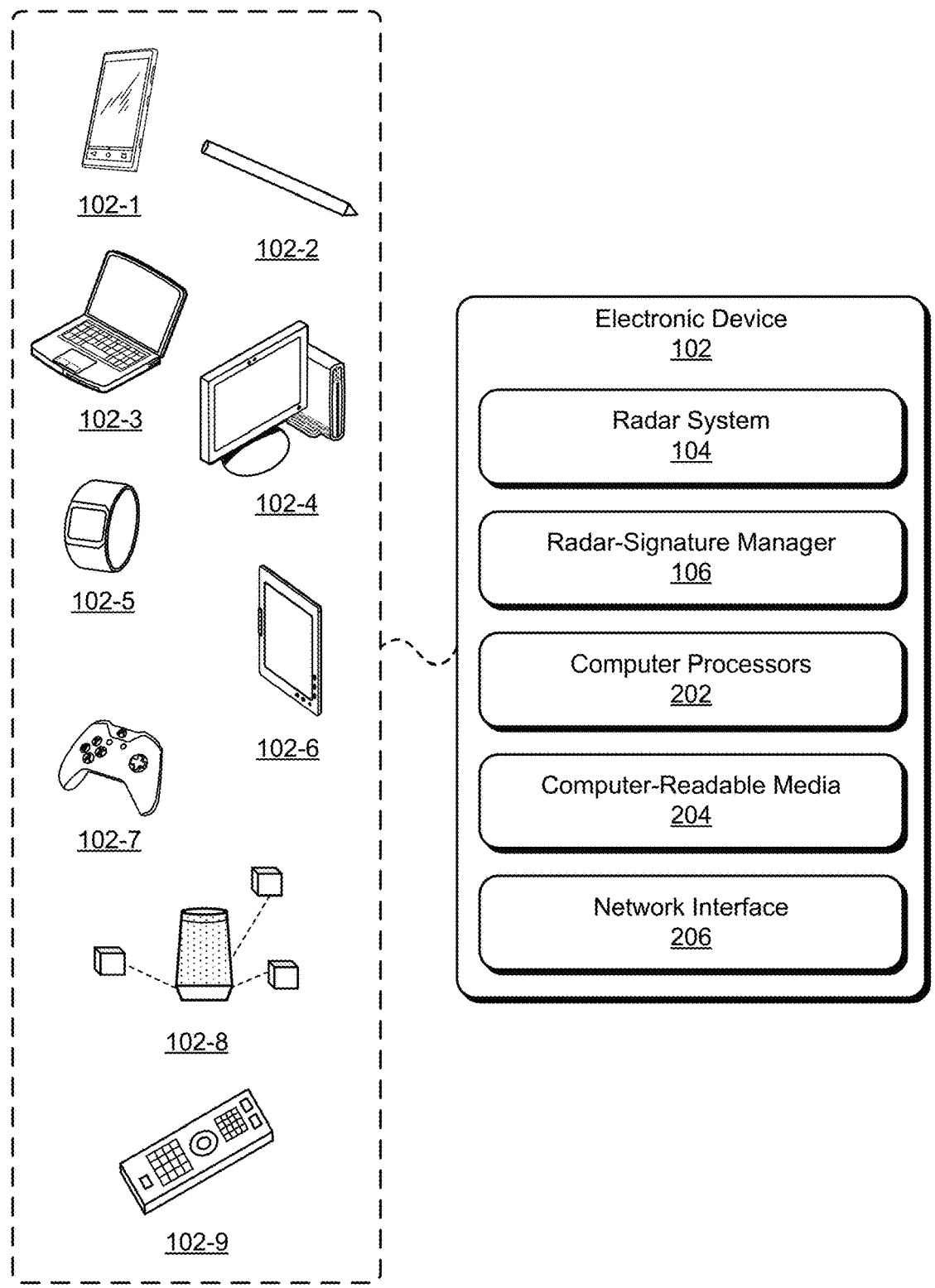
FIG. 2 illustrates an example implementation of the electronic device of FIG. 1 that can implement a radar-image shaper for radar-based applications.

In more detail, consider FIG. 2, which illustrates an example implementation 200 of the electronic device 102 (including the radar system 104, the signature manager 106, the signature library 108, and optionally, the 3D gesture module 116) that can implement a radar-image shaper for radar-based applications. The electronic device 102 of FIG. 2 is illustrated with a variety of example devices, including a smartphone 102-1, a stylus 102-2, a laptop 102-3, a desktop computer 102-4, a computing watch 102-5, a tablet 102-6, a gaming system 102-7, a home-automation and control system 102-8, and a remote control 102-9. The electronic device 102 can also include other devices, such as televisions, entertainment systems, audio systems, automobiles, drones, track pads, drawing pads, netbooks, e-readers, home security systems, and other home appliances. Note that the electronic device 102 can be wearable, non-wearable but mobile, or relatively immobile (e.g., desktops and appliances).

It should be noted that exemplary overall lateral dimensions of the electronic device 102 can be, for example, approximately eight centimeters by approximately fifteen centimeters. Exemplary footprints of the radar system 104 can be even more limited, such as approximately four millimeters by six millimeters with antennas included. The requirement of such a limited footprint for the radar system 104, which is needed to accommodate the many other desirable features of the electronic device 102 in such a space-limited package (e.g., a fingerprint sensor, other non-radar sensors, and so forth) combined with power and processing limitations, can lead to compromises in the accuracy and efficacy of radar gesture detection, at least some of which can be overcome in view of the teachings herein.

The electronic device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. The electronic device 102 may also include a network interface 206. The electronic device 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 operates as a monostatic radar by transmitting and receiving its own radar signals. In some implementations, the radar system 104 may also cooperate with other radar systems 104 that are within an external environment to implement a bistatic radar, a multistatic radar, or a network radar. Constraints or limitations of the electronic device 102, however, may impact a design of the radar system 104. The electronic device 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 and the signature manager 106 are illustrated as part of the electronic device 102. In other implementations, either or both of the radar system 104 and the signature manager 106 may be separate or remote from the electronic device 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 14 illustrate some of many possible environments and devices capable of employing the described techniques. FIGS. 3-6 describe additional details and features of the radar system 104. In FIGS. 3-6, the radar system 104 is described in the context of the electronic device 102, but as noted above, the applicability of the features and advantages of the described systems and techniques are not necessarily so limited, and other embodiments involving other types of electronic devices may also be within the scope of the present teachings.

Figure 3:
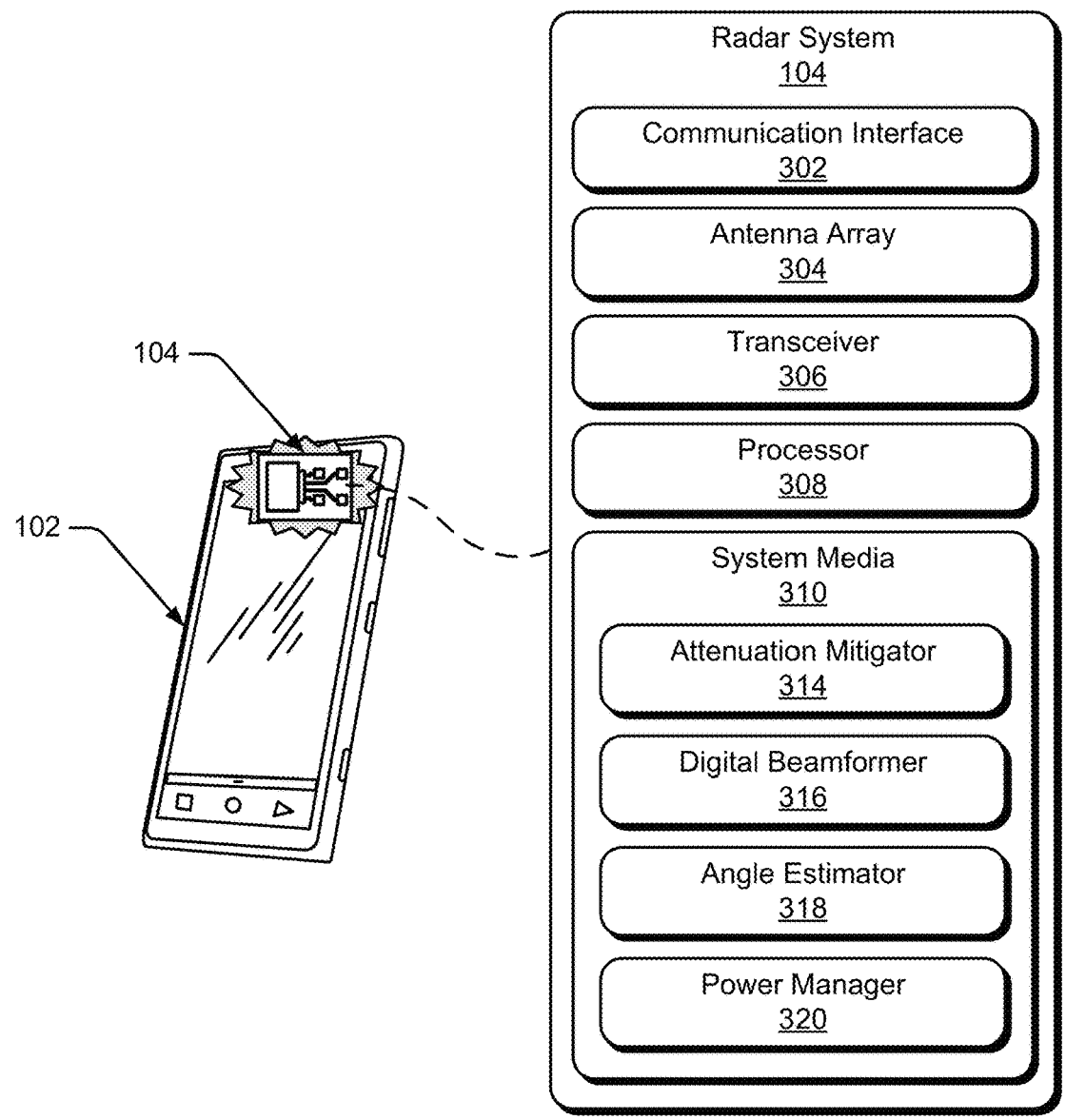
FIG. 3 illustrates an example implementation of the radar system of FIG. 2.

FIG. 3 illustrates an example implementation 300 of the radar system 104 that can be used to enable a radar-image shaper for radar-based applications. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the electronic device 102) or some combination thereof.

The system media 310, which may be included within, or be separate from, the computer-readable media 204 of the electronic device 102, includes one or more of the following modules: an attenuation mitigator 314, a digital beamformer 316, an angle estimator 318, or a power manager 320. These modules can compensate for, or mitigate the effects of, integrating the radar system 104 within the electronic device 102, thereby enabling the radar system 104 to recognize particular radar signatures (e.g., particular radar cross-sections or frequency responses), recognize small or complex gestures, distinguish between different characteristic dispositions of the electronic device 102, another object (e.g., the object 112), or the user, continuously monitor an external environment, or realize a target false-alarm rate. With these features, the radar system 104 can be implemented within a variety of different devices, such as the devices illustrated in FIG. 2.

Using the communication interface 302, the radar system 104 can provide radar data to the signature manager 106. The communication interface 302 may be a wireless or wired interface based on the radar system 104 being implemented separate from, or integrated within, the electronic device 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the signature manager 106 to implement or enable a radar-image shaper for radar-based applications.

Figure 4:
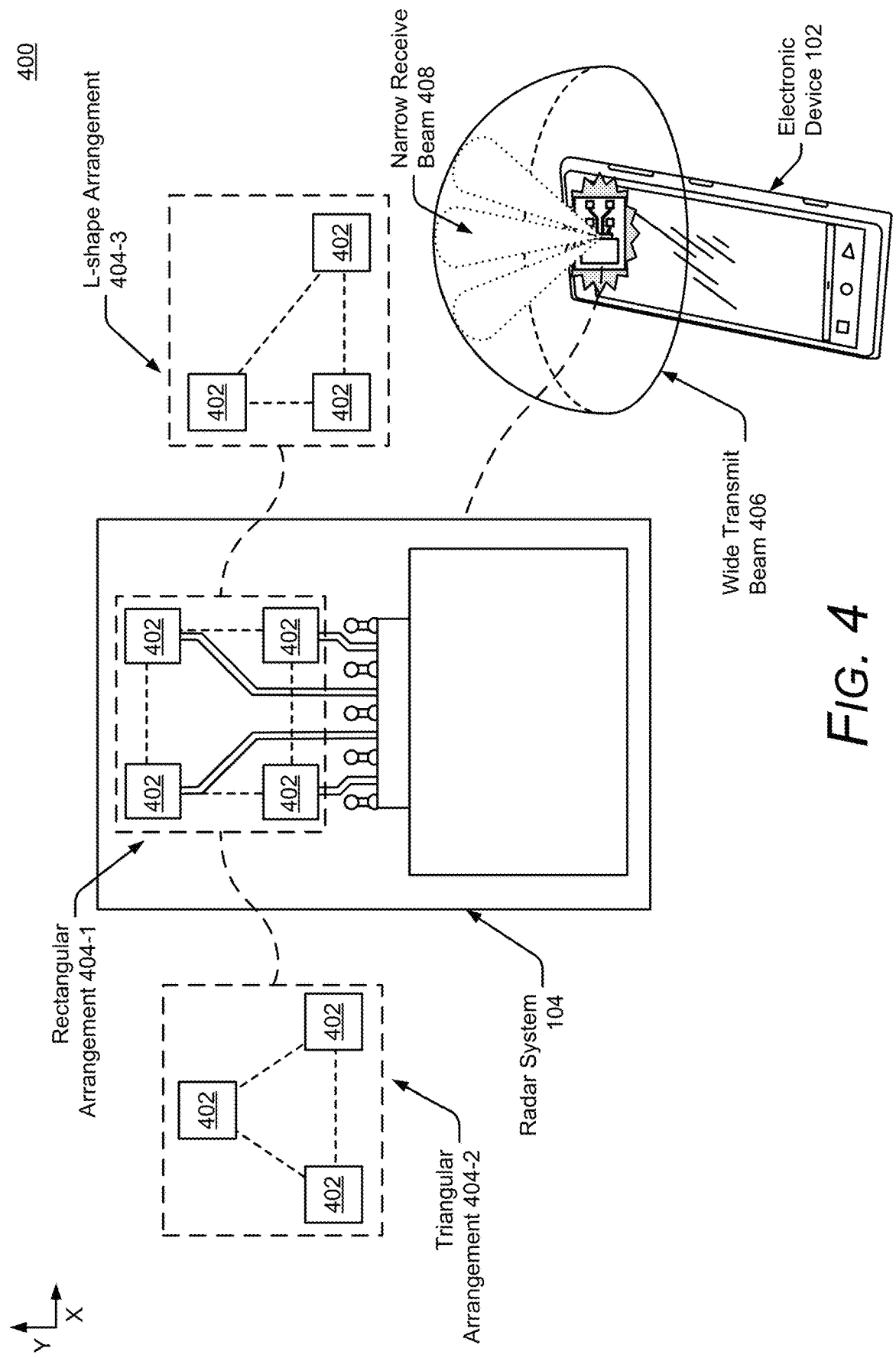
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the electronic device 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

A power manager 320 enables the radar system 104 to conserve power internally or externally within the electronic device 102. In some implementations, the power manager 320 communicates with the signature manager 106 or the smartphone power-management interface 118 to conserve power within either or both of the radar system 104 or the electronic device 102. Internally, for example, the power manager 320 can cause the radar system 104 to collect data using a predefined power mode or a specific duty cycle. In this case, the power manager 320 dynamically switches between different power modes such that response delay and power consumption are managed together based on the activity within the environment. In general, the power manager 320 determines when and how power can be conserved, and incrementally adjusts power consumption to enable the radar system 104 to operate within power limitations of the electronic device 102. In some cases, the power manager 320 may monitor an amount of available power remaining and adjust operations of the radar system 104 accordingly. For example, if the remaining amount of power is low, the power manager 320 may continue operating in a lower-power mode instead of switching to a higher-power mode.

The lower-power mode, for example, may use a lower duty cycle on the order of a few hertz (e.g., approximately 1 Hz or less than 5 Hz), which reduces power consumption to a few milliwatts (mW) (e.g., between approximately 2 mW and 8 mW). The higher-power mode, on the other hand, may use a higher duty cycle on the order of tens of hertz (Hz) (e.g., approximately 20 Hz or greater than 10 Hz), which causes the radar system 104 to consume power on the order of several milliwatts (e.g., between approximately 6 mW and 20 mW). While the lower-power mode can be used to monitor the external environment or detect an approaching user, the power manager 320 may switch to the higher-power mode if the radar system 104 determines the user is starting to perform a gesture. Different triggers may cause the power manager 320 to switch between the different power modes. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross-section). In general, the triggers that indicate a lower probability of the user interacting with the electronic device 102 or a preference to collect data using a longer response delay may cause a lower-power mode to be activated to conserve power.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (μs), milliseconds (ms), or seconds (s). Further, the power manager 320 can modify transmission power of the radar signals by adjusting an amount of amplification provided by a signal amplifier. Additionally, the power manager 320 can control the use of different hardware components within the radar system 104 to conserve power. If the processor 308 comprises a lower-power processor and a higher-power processor (e.g., processors with different amounts of memory and computational capability), for example, the power manager 320 can switch between utilizing the lower-power processor for low-level analysis (e.g., implementing the idle mode, detecting motion, determining a location of a user, or monitoring the environment) and the higher-power processor for situations in which high-fidelity or accurate radar data is requested by the signature manager 106 (e.g., for implementing the attention mode or the interaction mode, gesture recognition or user orientation).

In addition to the internal power-saving techniques described above, the power manager 320 can also conserve power within the electronic device 102 by activating or deactivating other external components or sensors that are within the electronic device 102. These external components may include speakers, a camera sensor, a global positioning system, a wireless communication transceiver, a display, a gyroscope, or an accelerometer. Because the radar system 104 can monitor the environment using a small amount of power, the power manager 320 can appropriately turn these external components on or off based on where the user is located or what the user is doing. In this way, the electronic device 102 can seamlessly respond to the user and conserve power without the use of automatic shut-off timers or the user physically touching or verbally controlling the electronic device 102. The described power management techniques can thus be used to provide various implementations of the idle mode, the attention mode, and the interaction mode, as described herein.

Figure 5:
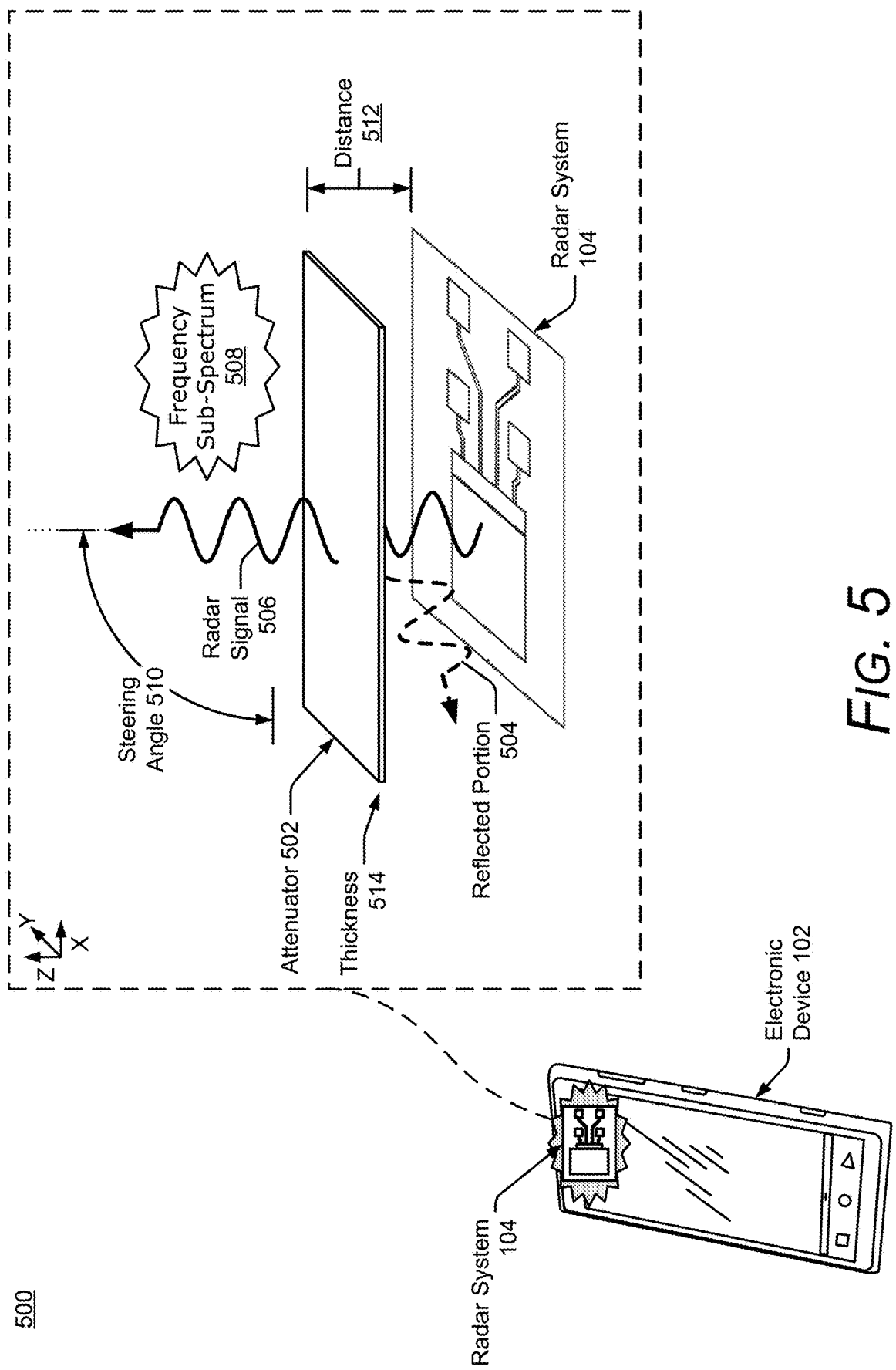
FIG. 5 illustrates additional details of an example implementation of the radar system of FIG. 2.

FIG. 5 illustrates additional details of an example implementation 500 of the radar system 104 within the electronic device 102. In the example 500, the antenna array 304 is positioned underneath an exterior housing of the electronic device 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the electronic device 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the electronic device 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
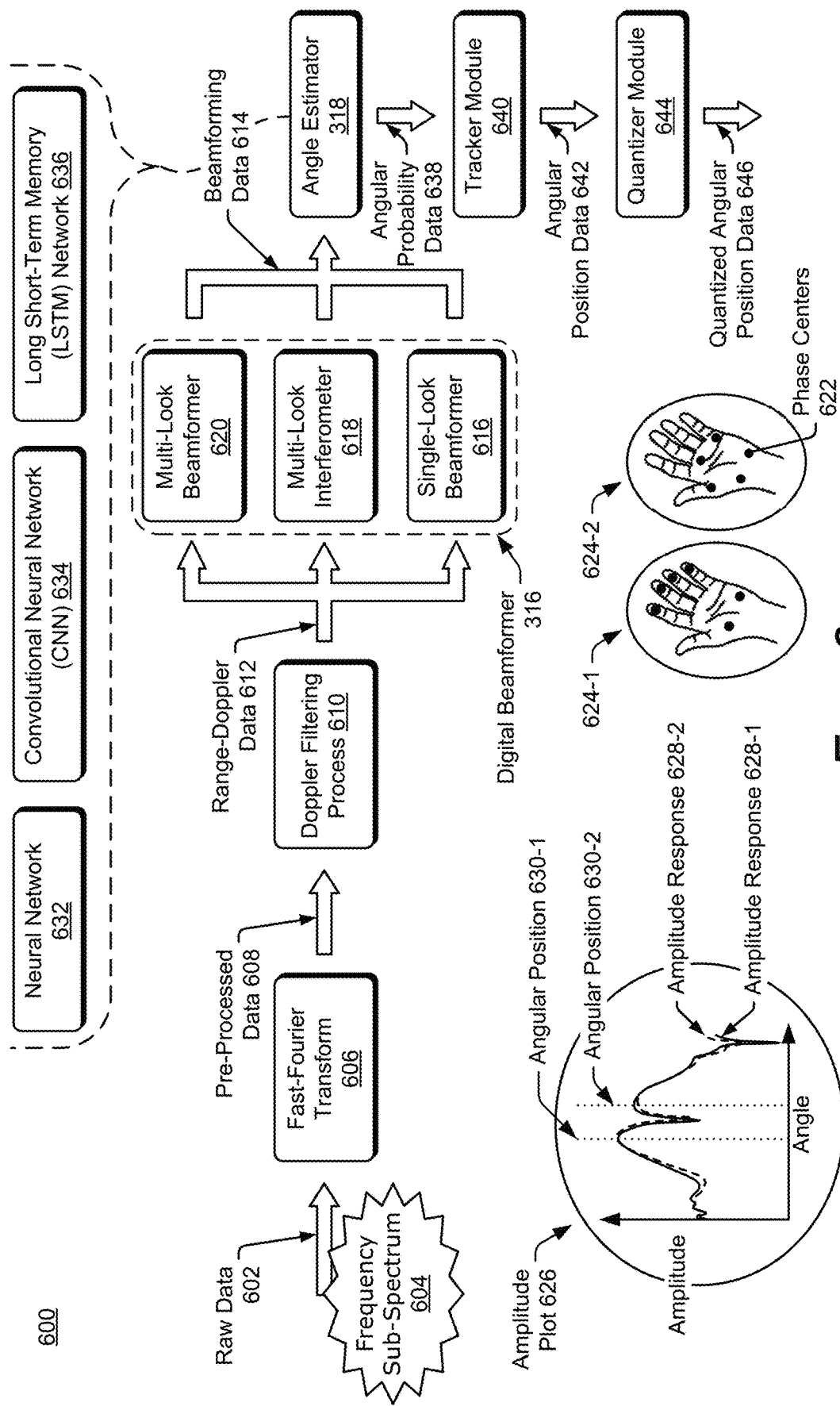
FIG. 6 illustrates an example scheme that can be implemented by the radar system of FIG. 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices and radar-based applications (e.g., the signature manager 106), and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal processing techniques, pattern matching techniques, or machine learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of electronic device 102 (e.g., computational capability or power constraints) or a target angular resolution for the signature manager 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the electronic device 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the signature manager 106. In some situations, fewer quantization levels can be used such that the quantized angular position data 646 indicates whether the target is to the right or to the left of the electronic device 102 or identifies a 90-degree quadrant the target is located within. This may be sufficient for some radar-based applications, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications, such as gesture recognition, or in implementations of the attention mode or the interaction mode as described herein. In some implementations, the digital beamformer 316, the angle estimator 318, the tracker module 640, and the quantizer module 644 are together implemented in a single machine learning module.

These and other capabilities and configurations, as well as ways in which entities of FIG. 1-6 act and interact, are set forth below. The described entities may be further divided, combined, used along with other sensors or components, and so on. In this way, different implementations of the electronic device 102, with different configurations of the radar system 104 and non-radar sensors, can be used to implement a radar-image shaper for radar-based applications. The example operating environment 100 of FIG. 1 and the detailed illustrations of FIGS. 2-6 illustrate but some of many possible environments and devices capable of employing the described techniques.

Example Radar-Image Shapers

Figure 7:
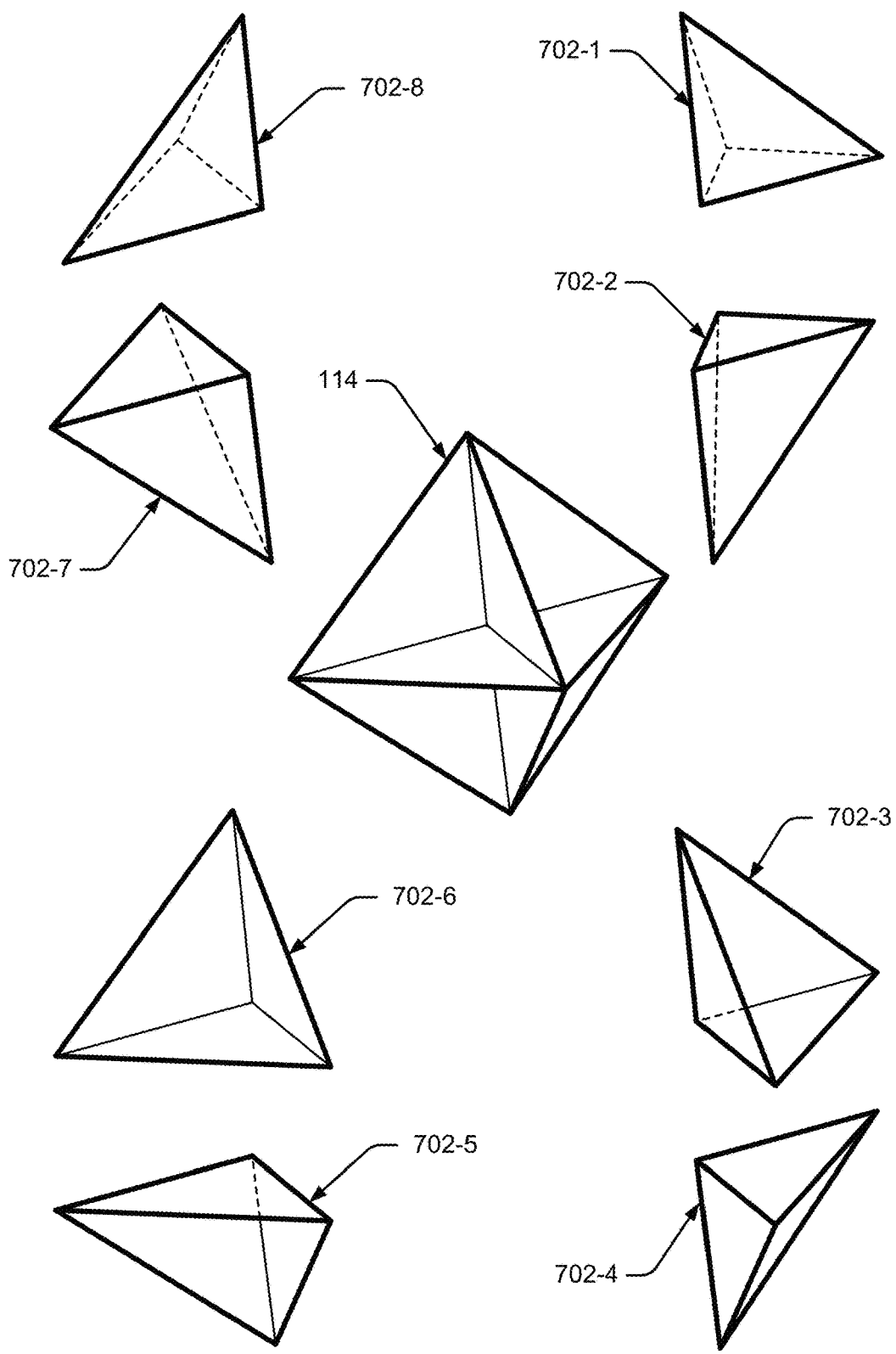
FIGS. 7 and 8 depict example implementations of a radar-image shaper, which can be used to enable the radar-image shaper for radar-based applications.
Figure 8:
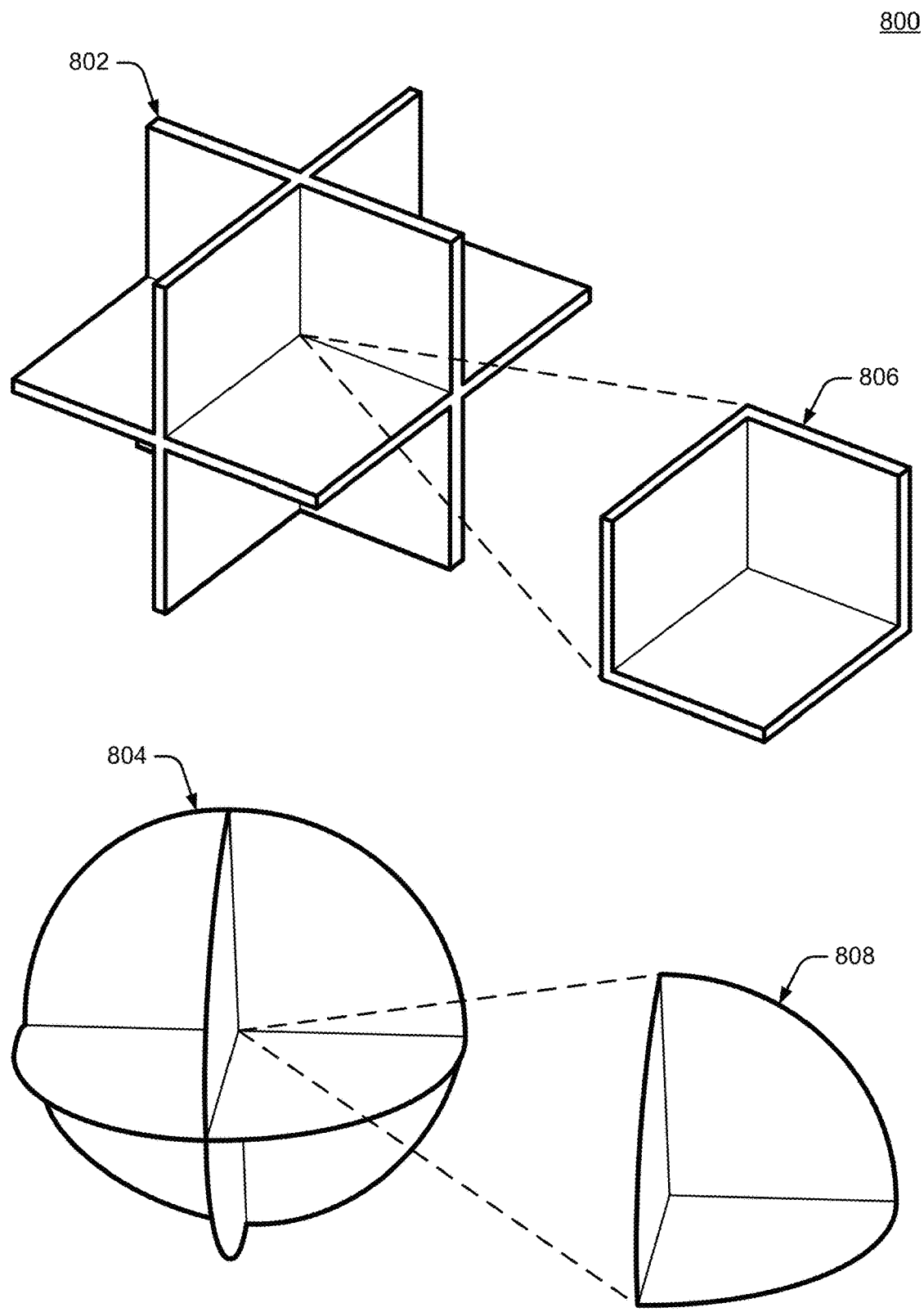

FIGS. 7 and 8 depict example implementations of the radar-image shaper 114, which can be used to enable a radar-image shaper for radar-based applications. FIG. 7 depicts an example implementation 700 of a radar-image shaper that is an octahedron comprising eight trihedral corner reflectors 702. Generally, a trihedral corner reflector is a shape consisting of three perpendicular intersecting flat surfaces. This shape, when made from a material that reflects radar signals, will reflect the signal back toward the source. In the example implementation 700, the individual trihedral corner reflectors 702-1 through 702-8 are made from triangular surfaces, but other shapes may also be used, as described with reference to FIG. 8.

FIG. 8 illustrates generally, at 800, example implementations 802 and 804 of a radar-image shaper. In the example radar-image shaper 802, the individual trihedral corner reflectors 806 are made from rectangular surfaces. In the example radar-image shaper 804, the individual trihedral corner reflectors 808 are made from quarter-circle-shaped surfaces. While the radar-image shapers 114, 700, 802, and 804 are shown in FIGS. 7 and 8 as being symmetrical with reference to one or more axes (e.g., an axis of an x-y-z coordinate system with an origin at a center of the radar-image shaper), asymmetrical implementations of the described shapes may also be used. Asymmetrical shapes may be used to determine the characteristic disposition of an object (e.g., the object 112). For example, an asymmetric radar-image shaper 114 may have a radar signature that allows the radar system 104 to determine the orientation (or another aspect of the characteristic disposition) of the object when only one radar-image shaper 114 is used with the object 112. Other symmetrical or asymmetrical shapes (not illustrated in FIG. 7 or 8) may also be used for the radar-image shaper. For example a sphere or ellipsoidal solid, or a sphere or ellipsoidal solid with trihedral or spherical indentations (dimples).

The example radar-image shapers described with reference to any or all of FIG. 1, 7, or 8 may be made from any suitable material that reflects radar signals, such as aluminum or an aluminum alloy. Generally the radar-image shaper 114 has an edge length that is a multiple of the wavelength of the radar signal. Thus, for radar signals with a sub-millimeter (mm) wavelength, the corner-reflectors that comprise the radar-image shaper may have an edge length (e.g., a longest edge length) of a multiple of the wavelength (e.g., between 1 mm and 10 mm, such as 3.5 mm or 5 mm) In other cases, with different wavelengths of the radar signal, the edge length of the radar-image shaper may be a different length.

Additionally, different materials absorb and reflect different frequencies of a radar signal, and the signature manager 106 may determine a radar signature of the radar-image shaper 114 based on a proportion of the radar signal that is reflected in a particular frequency range. For example, the signature library 108 may contain benchmark radar signatures for different shapes of radar-image shapers and different materials for some or all of the shapes. In some implementations, the radar-image shaper may be made of more than one material, which allows the signature manager 106 to distinguish between multiple radar-image shapers 114 of the same shape.

Consider an example in which the radar-image shaper has a first portion that is made from a first material (e.g., an aluminum alloy) and a second portion that is made from a second material (e.g., another type of aluminum alloy). The first material may absorb radar signals within a particular range of frequencies, and the second material may absorb radar signals within a second range of frequencies. Assume, in this example, that at least a part of the second range of frequencies is not included in the first range of frequencies. In this way, the signature manager 106 can distinguish between the two portions of the radar-image shaper 114, which may allow the signature manager 106 to determine the characteristic disposition of the radar-image shaper 114, and of a corresponding object 112, to a higher degree of accuracy.

Further, as noted, the radar-image shaper 114 may be attached to, or integrated with, an object (e.g., the object 112) and used to control a system or device, such as the electronic device 102 by determining the characteristic disposition of the radar-image shaper 114 and a corresponding characteristic disposition of the object. Because the object can be made from a material that is at least partially transparent to radar signals, such as the radar field 110, the radar-image shaper 114 may be encased in a solid (and opaque) material, which protects the radar-image shaper 114 from damage and prevents a user from being injured by any sharp edges or corner on the radar-image shaper 114. In contrast, conventional methods for controlling a system with a remote object often use cameras or infrared signals, which cannot be encased. Thus, the radar-image shaper for radar-based applications can enable more choices for design (shapes, materials, colors, and so forth) while still providing accurate measurements with lower power consumption, which can lead to a higher-quality user experience.

Example Methods

Figure 9:
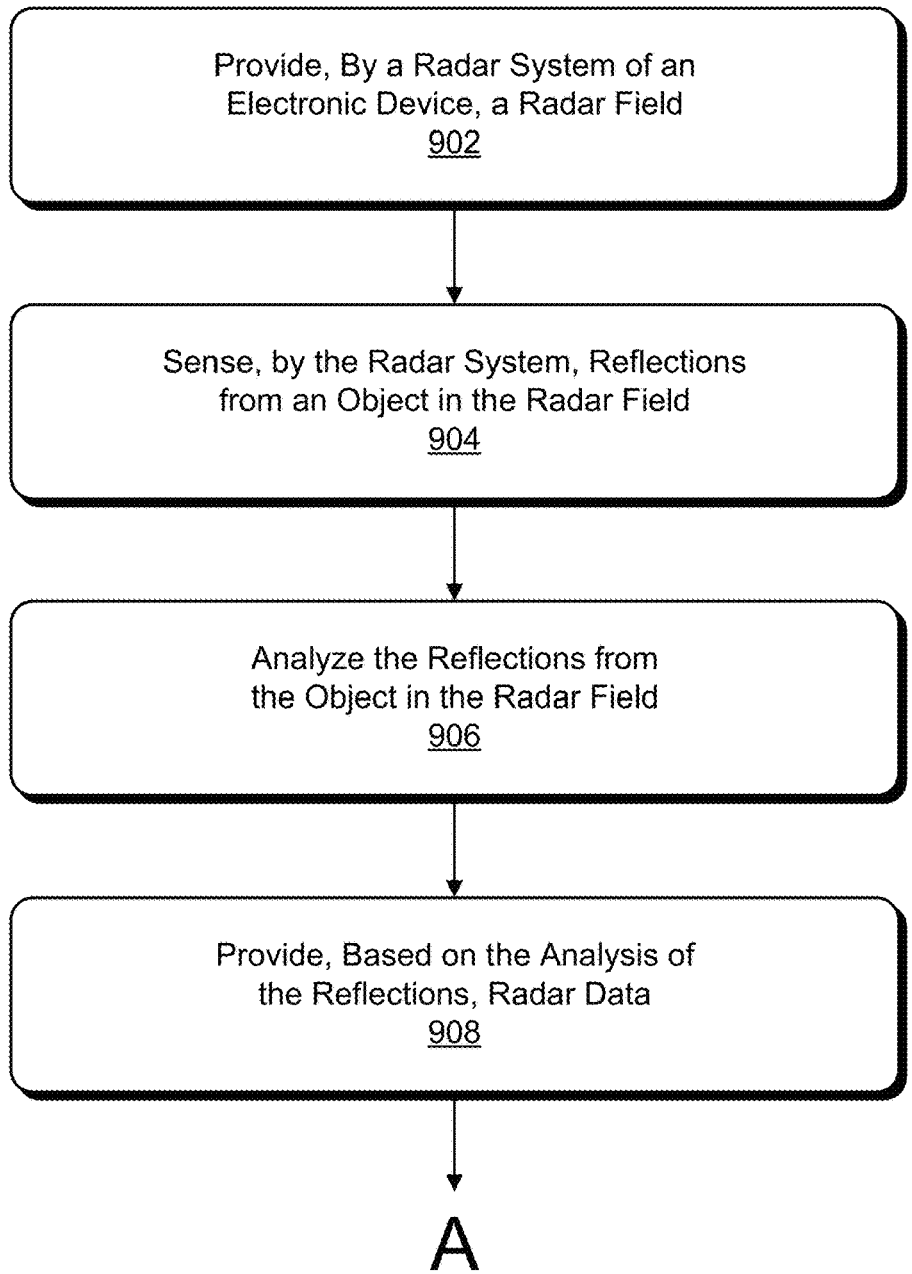
FIGS. 9 and 10 depict an example method that enables a radar-image shaper for radar-based applications.
Figure 10:
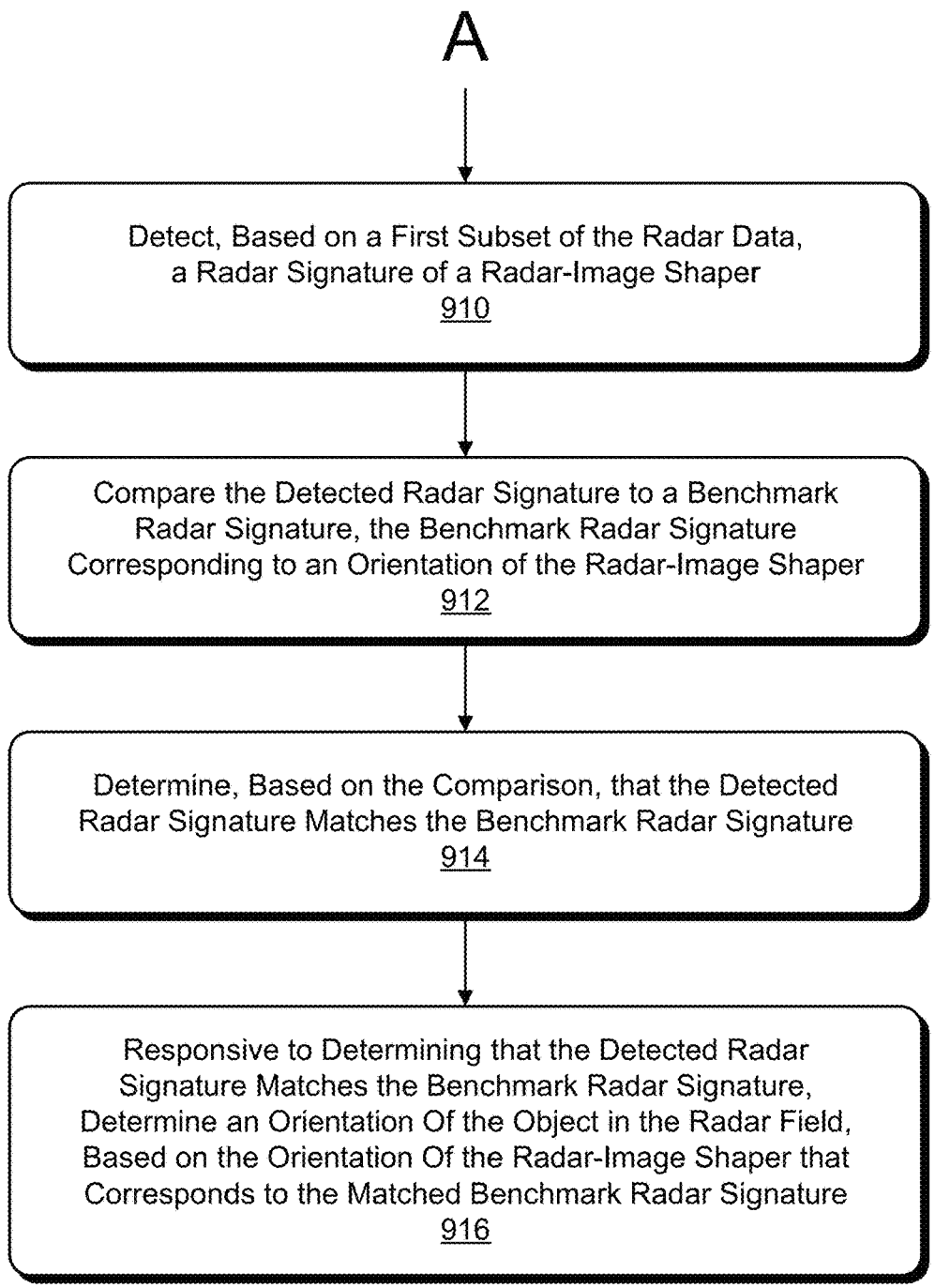

FIGS. 9 and 10 depict example method 900, which enables a radar-image shaper for radar-based applications. The method 900 can be performed with an electronic device that uses a radar system to provide a radar field. The radar field is used to determine a presence of an object in the radar field. The radar field can also be used to determine an intention level of the object, and the intention level can be used to determine whether the object intends to interact with the electronic device. Based on the determination of the object's intention, the electronic device can enter and exit different modes of functionality and power usage.

The method 900 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-6, reference to which is made for example only. The techniques are not limited to performance by one entity or multiple entities operating on one device.

At 902, a radar field is provided. This radar field can be provided by any of a variety of electronic devices (e.g., the electronic device 102 described above), that include, or are associated with, a radar system (e.g., the radar system 104) and an radar-signature manager (e.g., the signature manager 106, which may also include either or both of the signature library 108 and the 3D gesture module 116). Further, the radar field may be any of a variety of types of radar fields, such as the radar field 110 described above.

At 904, reflections from an object in the radar field are sensed by the radar system. The object may be any of a variety of objects, such as wood, plastic, metal, fabric, or organic material (e.g., a stylus or gaming controller, such as the object 112 described above, or a body part of a person). The object in the radar field includes, or is attached to, at least one radar-image shaper, such as the radar-image shaper 114 described above and with reference to FIGS. 7 and 8.

At 906, the reflections from the object in the radar field are analyzed. The analysis may be performed by any of a variety of entities (e.g., the radar system 104, the signature manager 106, or another entity) and may include various operations or determinations, such as those described with reference to FIGS. 3-6.

At 908, based on the analysis of the reflections, radar data is provided (e.g., the radar data described with reference to FIGS. 1-6). The radar data may be provided by any of a variety of entities, such as the radar system 104, the signature manager 106, or another entity. In some implementations, the radar system may provide the radar data and pass the radar data to other entities (e.g., any of the described radar-based applications, libraries, or modules). The description of the method 900 continues in FIG. 10, as indicated by the letter "A" after block 908 of FIG. 9, which corresponds to the letter "A" before block 910 of FIG. 10.

At 910, the radar system detects a radar signature of the radar-image shaper, using one or more subsets of the radar data. For example, the radar system 104 can generate radar data the signature manager 106 uses to detect the radar signature of the radar-image shaper 114.

At 912, the detected radar signature is compared to a benchmark radar signature that corresponds to a characteristic disposition of the radar-image shaper. For example, the signature manager 106 may compare the detected radar signature to the benchmark radar signature by using one or more subsets of the radar data to determine various features of the radar-image shaper 114 (e.g., characteristics of the radar data associated with particular materials, shapes, corners, edges, surfaces, or combinations thereof), and the detected features can be analyzed to determine a match to corresponding known features of the benchmark radar signature. As noted with reference to FIG. 1, in some implementations, the radar-signature manager may compare the detected radar signature to a plurality of benchmark radar signatures that correspond to different characteristic dispositions of the radar-image shaper. For example, the signature manager 106 may compare the detected radar signature to a plurality of benchmark radar signatures (e.g., benchmark radar signatures that are stored in a memory location such as the signature library 108).

At 914, based on the comparison of the detected radar signature to the benchmark radar signature, it is determined that the radar signature matches (or does not match) the benchmark radar signature. For example, the signature manager 106 can determine that the detected radar signature matches the benchmark radar signature.

At 916, in response to determining that the radar signature matches the benchmark radar signature, the characteristic disposition of the object in the radar field is determined, based on the characteristic disposition of the radar-image shaper that corresponds to the matched benchmark radar signature. For example, the signature manager 106 can determine the characteristic disposition of the object in the radar field, based on the characteristic disposition of the radar-image shaper 114 that corresponds to the matched benchmark radar signature. As noted, the signature manager 106 may determine a particular characteristic disposition of the radar-image shaper 114 with reference to the electronic device 102. For example, using a signature library such as the signature library 108, which can store data that includes characteristic dispositions of the object 112 that correspond to characteristic dispositions of the radar-image shaper 114, the signature manager 106 can also determine the characteristic disposition of object 112.

In some implementations, the radar-signature manager can also use one or more subsets of the radar data to determine a change in the characteristic disposition of the object in the radar field (e.g., by using the radar data to determine the characteristic disposition of the object over time). The radar-signature manager can also determine a gesture by the object, based on one or more changes in the characteristic disposition of the object. The radar-signature manager can then determine a function of the electronic device that corresponds to the gesture (e.g., using a three-dimensional (3D) gesture library, such as the 3D gesture module 116 described below) and cause the electronic device to provide the function that corresponds to the gesture.

Figure 11:
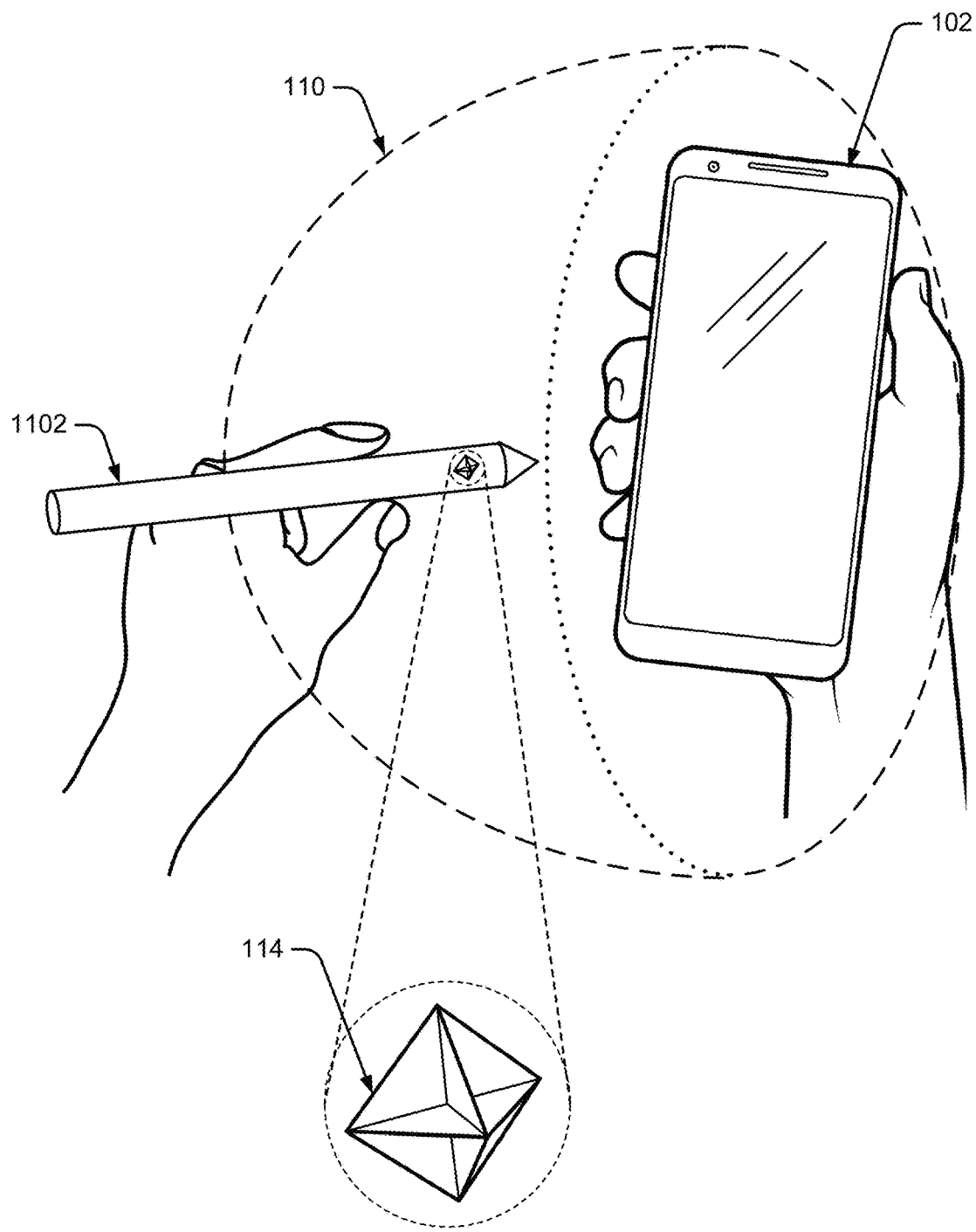
FIGS. 11-13 illustrate example implementations of objects and devices that can implement additional details of the radar-image shaper for radar-based applications.
Figure 12:
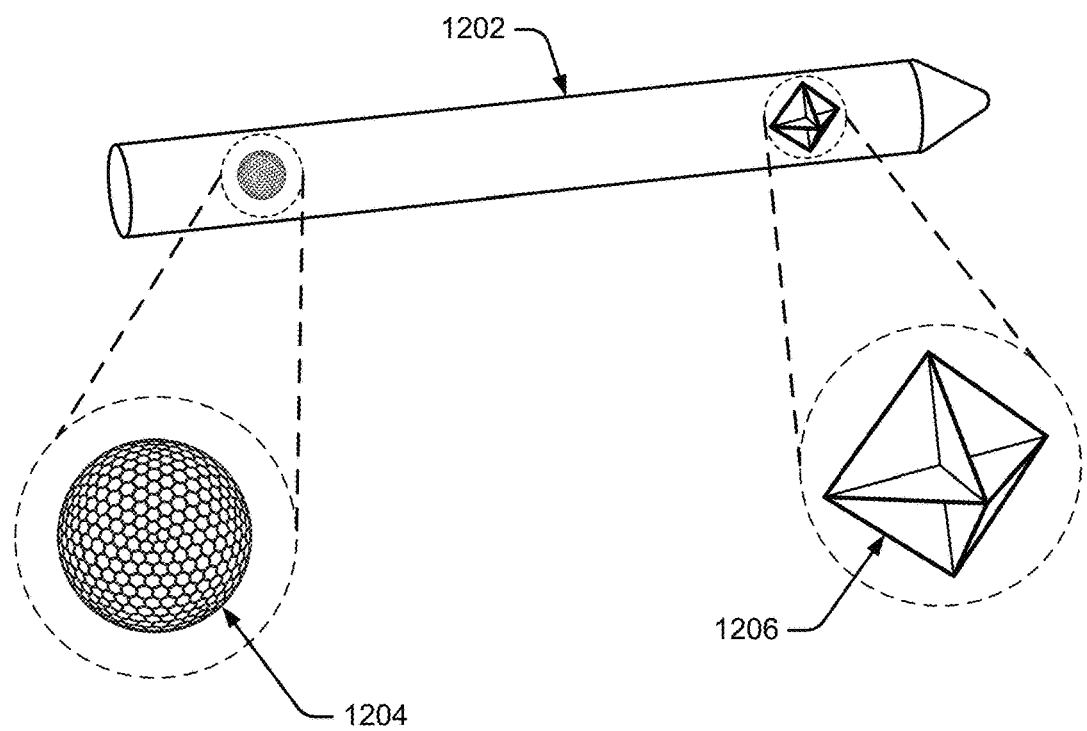
Figure 13:
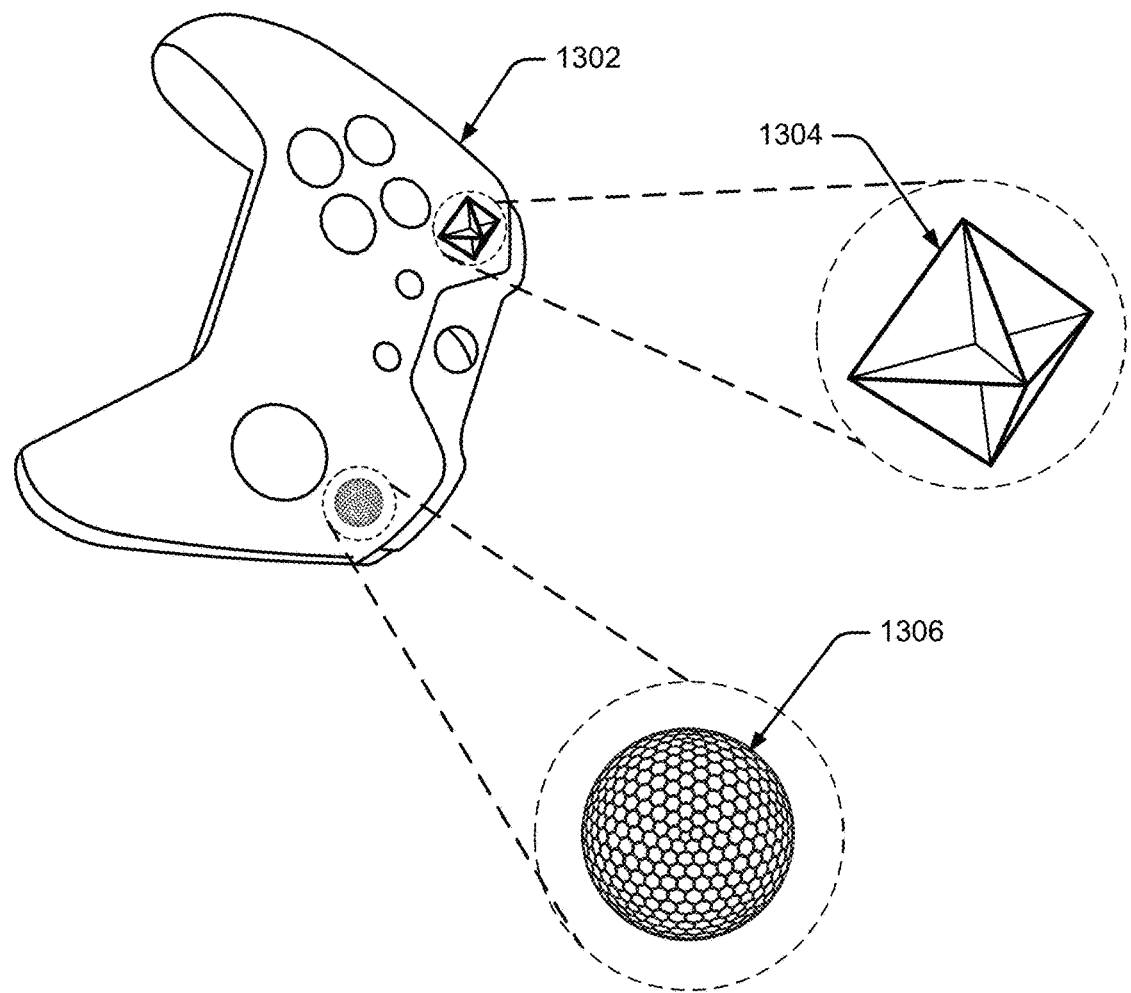

Consider, for example, FIGS. 11 through 13, which illustrate example implementations of objects and devices that can implement additional details of the radar-image shaper for radar-based applications. FIG. 11 depicts an example implementation 1100 of the object 112 (in this case, a stylus 1102), which can be used to interact with an electronic device, such as the electronic device 102. As shown in FIG. 11, the stylus 1102 has a housing and includes a radar-image shaper (e.g., the radar-image shaper 114) integrated within the stylus. The radar-image shaper 114 has a radar signature (e.g., reflections of radar signals from the radar field 110 or another source), which the radar system 104 can use to determine the characteristic disposition of the radar-image shaper 114 and thereby determine the characteristic disposition of the stylus 1102. As noted, in some implementations, another number of radar-image shapers 114 (e.g., two or three) may be attached to the object 112, and the radar-image shapers 114 may be in other locations on or within the stylus 1102.

For example, FIG. 12 illustrates another example implementation 1200 of the object 112 (in this case another stylus 1202). The stylus 1202 includes a housing and has two radar-image shapers (e.g., two radar-image shapers 114) integrated within the housing of the stylus 1202. As shown, the stylus 1202 includes a radar-image shaper 1204 that is integrated nearer to one end of the stylus housing and another radar-image shaper 1206 that is integrated nearer to another end of the stylus housing. In some implementations, the radar-image shapers may be different shapes, made from different materials, or both. As shown in FIG. 12, the radar-image shaper 1204 is spherical with dimples and the other radar-image shaper 1206 is made from corner reflectors arranged as an octahedron similar to the radar-image shaper 114 described with reference to FIG. 7 (e.g., an octahedron made from eight trihedral corner reflectors). While the styluses 1102 and 1202 are shown as generally cylindrical, other shapes and cross-sections may be used (e.g., elliptical).

In some implementations with multiple radar-image shapers, the radar-image shapers are spaced apart based on the wavelength of the radar signal (e.g., the radar field 110). For example, a distance between the multiple radar-image shapers may be based on a multiple of the wavelength (e.g., two, four, or six times the wavelength). In other cases, the distance between multiple radar-image shapers may be fixed, such as three centimeters (cm), five cm, seven cm, or ten cm. Further, the number of radar-image shapers can affect what aspects of the characteristic disposition, or an amount of detail related to the characteristic disposition, can be detected by the radar system. Thus, a single radar-image shaper allows the radar system to detect a point and determine its characteristic disposition, two radar-image shapers allow the radar system to detect a segment and determine its characteristic disposition, and so forth.

FIG. 13 depicts another example implementation 1300 of the object 112 (in this case, a gaming controller 1302), which can be used to interact with an electronic device, such as the electronic device 102. As shown in FIG. 13, the gaming controller 1302 has a housing and includes two radar-image shapers 1304 and 1306 (e.g., two of the radar-image shapers 114) integrated within the housing. The radar-image shaper 1304 is an octahedron made from eight trihedral corner reflectors and the radar-image shaper 1306 is a sphere with dimples. Because they are different shapes, the radar-image shaper 1304 and the radar-image shaper 1306 have different radar signatures (e.g., reflections of radar signals from the radar field 110 or another source). Having different radar signatures allows the radar system 104 to distinguish between the radar-image shaper 1304 and the radar-image shaper 1306, and the radar system 104 can use the different radar signatures to determine characteristic dispositions of the radar-image shapers 1304 and 1306 and thereby determine a characteristic disposition of the gaming controller 1302. Other examples implementations of the object 112 (not illustrated) include a smartphone case (e.g., with a radar-image shaper 114 in one or more locations), a remote control for a device or appliance, and so forth.

Additionally, because the radar system 104 (and the signature manager 106) can determine the characteristic dispositions of the object 112 (e.g., the stylus 1102, the stylus 1202, and the gaming controller 1302), the object 112 can be used to make 3D gestures, as described with respect to FIG. 1. Consider, for example, a stylus, such as either of the styluses 1102 or 1202, and an electronic device (e.g., the electronic device 102) that use radar signals (e.g., the radar field 110) to detect 3D gestures that can be used to control the electronic device 102 or provide additional functionality. In this example, a user may make a variety of gestures that provide additional functionality or make existing functionality easier and more intuitive. For example, in a radar-based drawing application, a user may rotate the stylus between a thumb and a finger, or between two fingers, to increase or decrease a line thickness or brush size. The user may use a "shaking" gesture to pick a different brush or change from a brush or pen to an eraser. Similarly, in a radar-based drawing application, the user may draw or sketch in 2½ D or in full 3D. Further, in a radar-based application with editing functions, a user may draw on a screen or other surface and use the 3D gestures with the stylus to create 3D volumes from 2D drawings (e.g., select a corner or other perimeter point on a 2D square or circle and lift the stylus off of the screen to create a cube or sphere). Once a 3D object exists, 3D gestures may be used to rotate, cut, or otherwise manipulate the 3D object.

It should be noted that the described techniques and apparatuses for the radar-image shaper for radar-based applications have other uses as well. For example, users may be able to use a 3D printer, or another device, to create a customized control that has a particular predefined radar signature. Consider a customized knob or dial control, that can be used (e.g., by users with limited strength or dexterity) as an analog control for radar-based home automation systems, video/audio equipment, and so forth. In this way, users can have custom remote controls that can control different hardware, software, and applications, without the need of additional electronics.

Further, a customized stylus or other control may be used for authentication purposes. For example, a user may have a custom key fob or other device that can be used to make a 3D gesture that authenticates the user. It should be noted that these techniques for a radar-image shaper for radar-based applications may be more private and secure than other techniques. Not only are 3D gestures not typically obtainable by an unauthorized person (unlike, for example, a password), but also because a radar image of the user, even if it includes the user's body or face, does not visually identify the user like a photograph or video (e.g., when a camera is used to track and detect a controller or gestures).

Even so, further to the descriptions above, the user may be provided with controls allowing the user to make an election as to both whether and when any of the systems, programs, modules, or features described in this document may enable collection of user information (e.g., information about a user's social network, social actions or activities, profession, a user's preferences, or a user's current location), and whether the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of the user cannot be determined. Thus, the user may have control over what information is collected about the user, how that information is used, and what information is provided to or about the user.

Example Computing System

Figure 14:
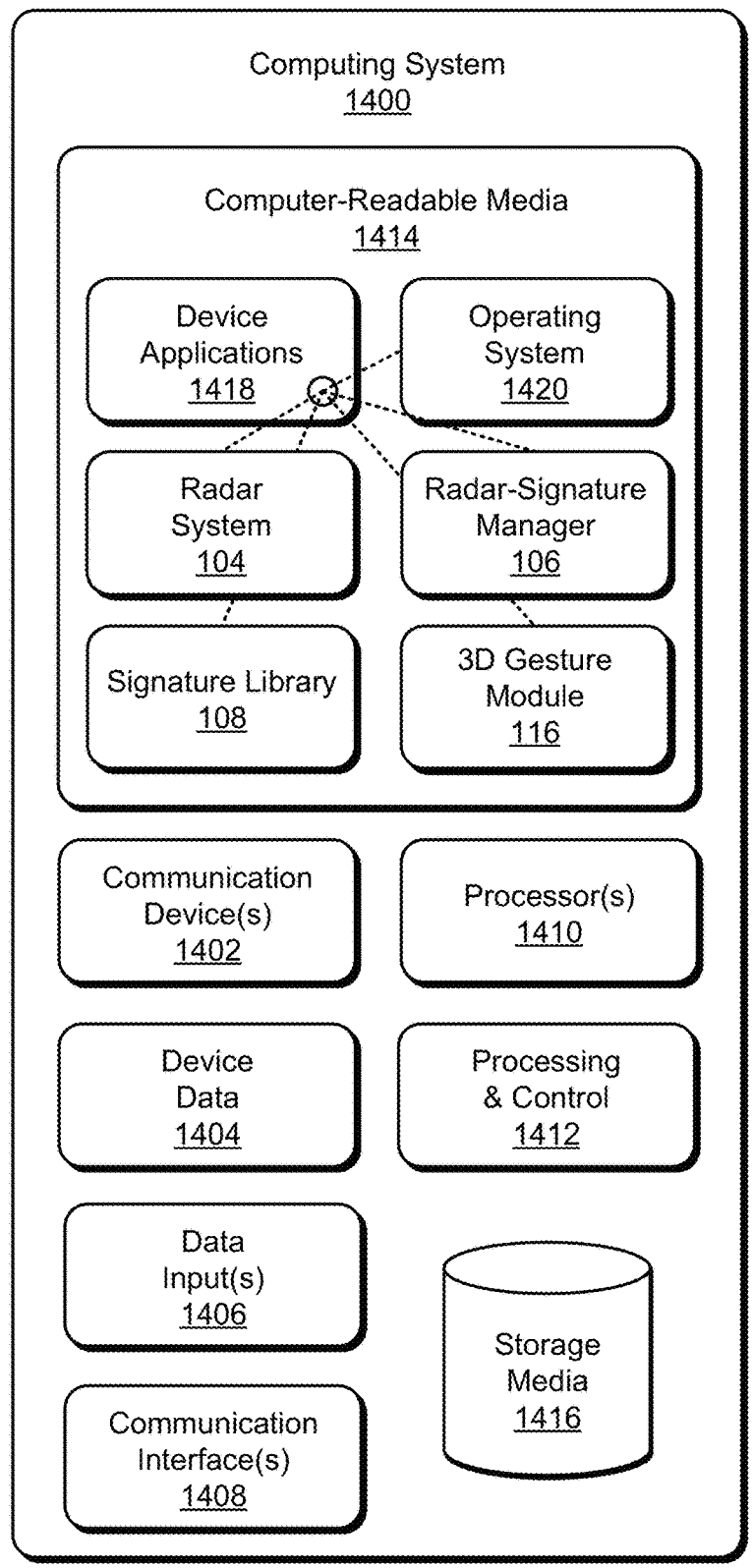
FIG. 14 illustrates various components of an example computing system that can be implemented as any type of client, server, and/or electronic device as described with reference to FIGS. 1-13 to implement, or in which techniques may be implemented that enable, a radar-image shaper for radar-based applications.

FIG. 14 illustrates various components of an example computing system 1400 that can be implemented as any type of client, server, and/or electronic device as described with reference to the previous FIGS. 1-13 to implement a radar-image shaper for radar-based applications.

The computing system 1400 includes communication devices 1402 that enable wired and/or wireless communication of device data 1404 (e.g., radar data, 3D gesture data, authentication data, reference data, received data, data that is being received, data scheduled for broadcast, and data packets of the data). The device data 1404 or other device content can include configuration settings of the device, media content stored on the device, and/or information associated with an object or a user of the device (e.g., an identity of a person within a radar field, customized gesture data, or a radar signature of a radar-image shaper,). Media content stored on the computing system 1400 can include any type of radar, biometric, audio, video, and/or image data. The computing system 1400 includes one or more data inputs 1406 via which any type of data, media content, and/or inputs can be received, such as human utterances, interactions with a radar field, touch inputs, user-selectable inputs (explicit or implicit), messages, music, television media content, recorded video content, and any other type of audio, video, and/or image data received from any content and/or data source. The data inputs 1406 may include, for example, the signature manager 106, the signature library 108, or the 3D gesture module 116.

The computing system 1400 also includes communication interfaces 1408, which can be implemented as any one or more of a serial and/or parallel interface, a wireless interface, any type of network interface, a modem, and as any other type of communication interface. The communication interfaces 1408 provide a connection and/or communication links between the computing system 1400 and a communication network by which other electronic, computing, and communication devices communicate data with the computing system 1400.

The computing system 1400 includes one or more processors 1410 (e.g., any of microprocessors, controllers, or other controllers) that can process various computer-executable instructions to control the operation of the computing system 1400 and to enable techniques for, or in which can be implemented, a radar-image shaper for radar-based applications. Alternatively or additionally, the computing system 1400 can be implemented with any one or combination of hardware, firmware, or fixed logic circuitry that is implemented in connection with processing and control circuits, which are generally identified at 1412. Although not shown, the computing system 1400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1400 also includes computer-readable media 1414, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1400 can also include a mass storage media device (storage media) 1416.

The computer-readable media 1414 provides data storage mechanisms to store the device data 1404, as well as various device applications 1418 and any other types of information and/or data related to operational aspects of the computing system 1400. For example, an operating system 1420 can be maintained as a computer application with the computer-readable media 1414 and executed on the processors 1410. The device applications 1418 may include a device manager, such as any form of a control application, software application, signal-processing and control modules, code that is native to a particular device, an abstraction module, a gesture recognition module, and other modules. The device applications 1418 may also include system components, engines, or managers to implement a radar-image shaper for radar-based applications, such as the radar system 104, the signature manager 106, the signature library 108, or the 3D gesture module 116. The computing system 1400 may also include, or have access to, one or more machine learning systems.

CONCLUSION

Although implementations of techniques for, and apparatuses enabling, a radar-image shaper for radar-based applications have been described in language specific to features and/or methods, it is to be understood that the subject of the appended claims is not necessarily limited to the specific features or methods described. Rather, the specific features and methods are disclosed as example implementations enabling a radar-image shaper for radar-based applications.

What is claimed is:

1. An electronic device, comprising:
a radar system, implemented at least partially in hardware, configured to:
provide a radar field;
sense reflections from an object in the radar field;
analyze the reflections from the object in the radar field; and
provide, based on the analysis of the reflections, radar data;
one or more computer processors; and
one or more computer-readable media having instructions stored thereon that, responsive to execution by the one or more computer processors, implement a radar-signature manager configured to:
detect, based on a first subset of the radar data, a radar signature of a radar-image shaper that is attached to the object in the radar field;
compare the detected radar signature to a benchmark radar signature that corresponds to a characteristic disposition of the radar-image shaper, the comparison comprising to:
determine features of the radar-image shaper based on the first subset of the radar data; and
analyze the determined features to determine a match to known features of the benchmark radar signature;
determine, based on the comparison, that the detected radar signature matches the benchmark radar signature; and
responsive to the determination that the detected radar signature matches the benchmark radar signature, determine, based on the characteristic disposition of the radar-image shaper that corresponds to the matched benchmark radar signature, a characteristic disposition of the object in the radar field.

2. The electronic device of claim 1, wherein the radar-signature manager is further configured to:
determine, based on a second subset of the radar data, a change in the characteristic disposition of the object in the radar field;
based on the change in the characteristic disposition of the object in the radar field, determine a gesture by the object in the radar field;
determine a function of the electronic device that corresponds to the gesture; and
cause the electronic device to provide the function.

3. The electronic device of claim 1, wherein the radar-signature manager is further configured to compare the detected radar signature to the benchmark radar signature by comparison of the detected radar signature to a plurality of benchmark radar signatures, each benchmark radar signature of the plurality of radar signature corresponding to a different characteristic disposition of the radar-image shaper.

4. The electronic device of claim 1, wherein the radar-image shaper is a corner reflector.

5. The electronic device of claim 4, wherein the corner reflector is an octahedron comprising eight trihedral corner reflectors.

6. The electronic device of claim 1, wherein the radar-image shaper is asymmetrical.

7. The electronic device of claim 1, wherein:
the radar-image shaper comprises a first portion made from a first material and a second portion made from a second material;
the first material absorbs radar signals within a first range of frequencies; and
the second material absorbs radar signals within a second range of frequencies, at least a part of the second range of frequencies not included in the first range of frequencies.

8. The electronic device of claim 1, wherein a length of a longest edge of the radar-image shaper is between 1 millimeter and ten millimeters.

9. The electronic device of claim 1, wherein the radar system further comprises a digital beamformer and an angle estimator, and the radar system is configured to monitor angles in a field of view between approximately −90 degrees and approximately 90 degrees.

10. The electronic device of claim 1, wherein the characteristic disposition of the radar-image shaper includes one or more of:
an orientation of the radar-image shaper with respect to the radar system;
a location of the radar-image shaper with respect to the radar system;
a velocity of the radar-image shaper; or
a direction of a movement of the radar-image shaper.

11. A method implemented by an electronic device that includes a radar system, the method comprising:
providing, by the radar system, a radar field;
sensing, by the radar system, reflections from an object in the radar field;
analyzing the reflections from the object in the radar field;
providing, based on the analysis of the reflections, radar data;
detecting, based on a first subset of the radar data, a radar signature of a radar-image shaper that is attached to the object in the radar field;
comparing the detected radar signature to a benchmark radar signature, the benchmark radar signature corresponding to a characteristic disposition of the radar-image shaper, the comparison comprising:
determining features of the radar-image shaper based on the first subset of the radar data; and
analyzing the determined features to determine a match to known features of the benchmark radar signature;
determining, based on the comparison, that the detected radar signature matches the benchmark radar signature; and
responsive to determining that the detected radar signature matches the benchmark radar signature, determining a characteristic disposition of the object in the radar field, based on the characteristic disposition of the radar-image shaper that corresponds to the matched benchmark radar signature.

12. The method of claim 11, further comprising:
determining, based on a second subset of the radar data, a change in the characteristic disposition of the object in the radar field;
determining, based on the change in the characteristic disposition of the object in the radar field, a gesture by the object in the radar field;
determining a function of the electronic device that corresponds to the gesture; and
causing the electronic device to provide the function.

13. The method of claim 11, wherein comparing the detected radar signature to the benchmark radar signature further comprises comparing the detected radar signature to a plurality of benchmark radar signatures, each benchmark radar signature of the plurality of radar signatures corresponding to a different characteristic disposition of the radar-image shaper.

14. The method of claim 11, wherein the characteristic disposition of the radar-image shaper includes one or more of:
  an orientation of the radar-image shaper with respect to the radar system;
  a location of the radar-image shaper with respect to the radar system;
  a velocity of the radar-image shaper; or
  a direction of a movement of the radar-image shaper.

15. A stylus, comprising:
  a stylus housing; and
  a radar-image shaper integrated with the stylus housing, the radar-image shaper configured to provide a radar signature that is detectable by a radar system, the radar signature effective to enable the radar system to determine a characteristic disposition of the housing, the determination of the characteristic disposition of the housing comprising:
    detecting the radar signature of the radar-image shaper;
    comparing the detected radar signature to a benchmark radar signature, the benchmark radar signature corresponding to a characteristic disposition of the radar-image shaper, the comparison comprising:
      determining features of the radar-image shaper, based on the radar signature; and
      analyzing the determined features to determine a match to known features of the benchmark radar signature;
    determining, based on the comparison, that the detected radar signature matches the benchmark radar signature; and
    responsive to determining that the detected radar signature matches the benchmark radar signature, determining a characteristic disposition of the housing based on the characteristic disposition of the radar-image shaper that corresponds to the matched benchmark radar signature.

16. The stylus of claim 15, further comprising another radar-image shaper, and wherein:
  the radar-image shaper is integrated nearer to a first end of the housing; and
  the other radar-image shaper is integrated nearer to a second end of the housing.

17. The stylus of claim 16, wherein the radar-image shaper and the other radar-image shaper are made from different materials.

18. The stylus of claim 16, wherein the radar-image shaper and the other radar-image shaper are different shapes.

19. The stylus of claim 15, wherein the housing has a cross-section that is cylindrical or elliptical.

20. The stylus of claim 15, wherein the characteristic disposition of the radar-image shaper includes one or more of:
  an orientation of the radar-image shaper with respect to the radar system;
  a location of the radar-image shaper with respect to the radar system;
  a velocity of the radar-image shaper; or
  a direction of a movement of the radar-image shaper.

* * * * *